United States Patent
Raghavan et al.

(10) Patent No.: US 12,537,587 B2
(45) Date of Patent: Jan. 27, 2026

(54) RECEIVER ALIGNMENT TO ENHANCE SIGNAL QUALITY IN NEAR-FIELD COMMUNICATIONS

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Mohammad Ali Tassoudji, San Diego, CA (US); Yu-Chin Ou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/342,596

(22) Filed: Jun. 27, 2023

(65) Prior Publication Data

US 2025/0007599 A1 Jan. 2, 2025

(51) Int. Cl.
*H04B 7/08* (2006.01)
*H04B 7/06* (2006.01)

(52) U.S. Cl.
CPC ......... *H04B 7/0834* (2013.01); *H04B 7/0608* (2013.01)

(58) Field of Classification Search
CPC ....... H04B 7/0834; H04B 7/0608; H04B 5/00
See application file for complete search history.

(56) References Cited

U.S. PATENT DOCUMENTS

| | | | |
|---|---|---|---|
| 11,659,916 B2 | 5/2023 | Perkins et al. | |
| 2017/0300717 A1* | 10/2017 | Hu | H04B 7/0608 |
| 2020/0137537 A1* | 4/2020 | Tamanaha | H01Q 1/3233 |
| 2021/0341594 A1* | 11/2021 | Lee | G01S 13/66 |
| 2022/0004836 A1* | 1/2022 | Perkins | H04L 9/0825 |
| 2022/0407573 A1* | 12/2022 | Dou | H01Q 21/28 |

OTHER PUBLICATIONS

International Search Report and Written Opinion—PCT/US2024/032592—ISA/EPO—Sep. 26, 2024.

* cited by examiner

*Primary Examiner* — Hashim S Bhatti
(74) *Attorney, Agent, or Firm* — Holland & Hart LLP

(57) ABSTRACT

Methods, systems, and devices for wireless communication are described. A receiver may orient its antenna arrays based on signaling from a transmitter and a distance between the receiver and the transmitter. The transmitter may transmit an indication of an orientation of its antenna array. The receiver may receive the indication and may determine the distance between the receiver and the transmitter. Based on whether the distance between the receiver and the transmitter satisfies a threshold distance from the transmitter, the receiver may select an orientation for its antenna array. The receiver may select a first antenna orientation based on the distance failing to satisfy the threshold distance and may select a second orientation based on the distance satisfying the threshold distance.

30 Claims, 16 Drawing Sheets

RECEIVER ALIGNMENT TO ENHANCE SIGNAL QUALITY IN NEAR-FIELD COMMUNICATIONS

FIELD OF TECHNOLOGY

The following relates to wireless communication, including receiver alignment (e.g., relative to the transmitter's orientation) to enhance signal quality in near-field communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support receiver alignment to enhance signal quality in near-field communications. For example, the described techniques enable a receiver to dynamically select (e.g., adjust) an orientation for one or more of its associated antenna arrays based on receiving an indication of a first orientation of an antenna array at a transmitter and a comparison of a distance between the receiver and the transmitter to a threshold distance. In some examples, if the distance between the receiver and transmitter fails to satisfy the threshold distance, the receiver may select a first orientation for the antenna array(s) at the receiver that is parallel to a second orientation of the antenna array(s) at the transmitter. In some examples, if the distance between the receiver and transmitter satisfies the threshold distance, the receiver may select an orientation for its antenna array(s) that is normal to a radial direction of the transmitter (e.g., pointed at the center of the transmitting antenna arrays).

A method for wireless communications by a receiver is described. The method may include receiving an indication of a first orientation of a first antenna array of a transmitter and communicating with the transmitter via a second antenna array of the receiver, where a second orientation of the second antenna array for the communicating is selected based on the first orientation and a comparison of a distance between the receiver and the transmitter to a threshold distance.

A receiver for wireless communications is described. The receiver may include one or more memories storing processor executable code, and one or more processors coupled with the one or more memories. The one or more processors may individually or collectively operable to execute the code to cause the receiver to receive an indication of a first orientation of a first antenna array of a transmitter and communicate with the transmitter via a second antenna array of the receiver, where a second orientation of the second antenna array for the communicating is selected based on the first orientation and a comparison of a distance between the receiver and the transmitter to a threshold distance.

Another receiver for wireless communications is described. The receiver may include means for receiving an indication of a first orientation of a first antenna array of a transmitter and means for communicating with the transmitter via a second antenna array of the receiver, where a second orientation of the second antenna array for the communicating is selected based on the first orientation and a comparison of a distance between the receiver and the transmitter to a threshold distance.

A non-transitory computer-readable medium storing code for wireless communications is described. The code may include instructions executable by a processor to receive an indication of a first orientation of a first antenna array of a transmitter and communicate with the transmitter via a second antenna array of the receiver, where a second orientation of the second antenna array for the communicating is selected based on the first orientation and a comparison of a distance between the receiver and the transmitter to a threshold distance.

Some examples of the method, receivers, and non-transitory computer-readable medium described herein may further include operations, features, means, or instructions for receiving a second indication from the transmitter including the threshold distance, where the second orientation may be based on the second indication.

In some examples of the method, receivers, and non-transitory computer-readable medium described herein, the threshold distance may be based on a size of the first antenna array.

In some examples of the method, receivers, and non-transitory computer-readable medium described herein, the threshold distance includes a first threshold distance for a first direction, a second threshold distance for a second direction, a third distance for a third direction, or a combination thereof.

In some examples of the method, receivers, and non-transitory computer-readable medium described herein, the threshold distance includes a first threshold value associated with a radial threshold distance.

In some examples of the method, receivers, and non-transitory computer-readable medium described herein, the second orientation may be parallel to the first orientation based on the distance between the receiver and the transmitter failing to satisfy the threshold distance.

In some examples of the method, receivers, and non-transitory computer-readable medium described herein, the second orientation may be normal to a radial direction between the transmitter and the receiver based on the distance between the receiver and the transmitter satisfying the threshold distance.

In some examples of the method, receivers, and non-transitory computer-readable medium described herein, selecting the second orientation may include operations, features, means, or instructions for selecting one or more of the set of multiple subarrays to use for the communicating based on the second orientation.

Some examples of the method, receivers, and non-transitory computer-readable medium described herein may further include operations, features, means, or instructions for transmitting an indication of a performance loss to the transmitter based on failing to orient the second antenna array according to the second orientation.

Some examples of the method, receivers, and non-transitory computer-readable medium described herein may further include operations, features, means, or instructions for generating an alert message for a user, the alert message coming from an application layer program and including an instruction to orient the second antenna array according to the second orientation.

In some examples of the method, receivers, and non-transitory computer-readable medium described herein, the indication of the first orientation may be received via a system information message, a control information message, or both.

In some examples of the method, receivers, and non-transitory computer-readable medium described herein, the indication of the first orientation includes a boresight direction of the first antenna array.

Some examples of the method, receivers, and non-transitory computer-readable medium described herein may further include operations, features, means, or instructions for determining the distance between the receiver and the transmitter by calculating a first location of the receiver and a second location of the transmitter based on a positioning protocol, the positioning protocol associated with a local coordinate system, a global coordinate system, or both.

A method for wireless communications by a transmitter is described. The method may include transmitting an indication of a first orientation of a first antenna array of the transmitter and communicating with a receiver via a second antenna array of the receiver, where a second orientation of the second antenna array for the communicating is based on the first orientation and a comparison of a distance between the transmitter and the receiver to a threshold distance.

A transmitter for wireless communications is described. The transmitter may include one or more memories storing processor executable code, and one or more processors coupled with the one or more memories. The one or more processors may individually or collectively operable to execute the code to cause the transmitter to transmit an indication of a first orientation of a first antenna array of the transmitter and communicate with a receiver via a second antenna array of the receiver, where a second orientation of the second antenna array for the communicating is based on the first orientation and a comparison of a distance between the transmitter and the receiver to a threshold distance.

Another transmitter for wireless communications is described. The transmitter may include means for transmitting an indication of a first orientation of a first antenna array of the transmitter and means for communicating with a receiver via a second antenna array of the receiver, where a second orientation of the second antenna array for the communicating is based on the first orientation and a comparison of a distance between the transmitter and the receiver to a threshold distance.

A non-transitory computer-readable medium storing code for wireless communications is described. The code may include instructions executable by a processor to transmit an indication of a first orientation of a first antenna array of the transmitter and communicate with a receiver via a second antenna array of the receiver, where a second orientation of the second antenna array for the communicating is based on the first orientation and a comparison of a distance between the transmitter and the receiver to a threshold distance.

Some examples of the method, transmitters, and non-transitory computer-readable medium described herein may further include operations, features, means, or instructions for determining a value for the threshold distance and transmitting, from the transmitter to the receiver, a second indication including the threshold distance, where the second orientation may be based on the second indication.

Some examples of the method, transmitters, and non-transitory computer-readable medium described herein may further include operations, features, means, or instructions for determining the value for the threshold distance may be based on a size of the first antenna array.

In some examples of the method, transmitters, and non-transitory computer-readable medium described herein, the threshold distance includes a first threshold distance for a first direction, a second threshold distance for a second direction, a third distance for a third direction, or a combination thereof.

In some examples of the method, transmitters, and non-transitory computer-readable medium described herein, the threshold distance includes a first threshold value associated with a radial threshold distance.

In some examples of the method, transmitters, and non-transitory computer-readable medium described herein, the second orientation may be parallel to the first orientation based on the distance between the receiver and the transmitter failing to satisfy the threshold distance.

In some examples of the method, transmitters, and non-transitory computer-readable medium described herein, the second orientation may be normal to a radial direction between the transmitter and the receiver based on the distance between the receiver and the transmitter satisfying the threshold distance.

Some examples of the method, transmitters, and non-transitory computer-readable medium described herein may further include operations, features, means, or instructions for receiving an indication of a performance loss from the receiver based on the receiver failing to orient the second antenna array according to the second orientation.

Some examples of the method, transmitters, and non-transitory computer-readable medium described herein may further include operations, features, means, or instructions for adjusting the first antenna array to operate according to a third orientation different than the first orientation based on receiving the indication of the performance loss and communicating with the receiver via the first antenna array and the second antenna array of the receiver.

Some examples of the method, transmitters, and non-transitory computer-readable medium described herein may further include operations, features, means, or instructions for increasing a transmit power for the first antenna array based on receiving the indication of the performance loss and communicating with the receiver in accordance with increasing the transmit power.

In some examples of the method, transmitters, and non-transitory computer-readable medium described herein, the indication of the first orientation may be transmitted via a system information message, a control information message, or both.

In some examples of the method, transmitters, and non-transitory computer-readable medium described herein, the indication of the first orientation includes a boresight direction of the first antenna array.

Some examples of the method, transmitters, and non-transitory computer-readable medium described herein may further include operations, features, means, or instructions for determining the distance between the receiver by calculating a first location of the transmitter and a second location of the receiver based on a positioning protocol, the positioning protocol associated with a local coordinate system, a global coordinate system, or both.

DETAILED DESCRIPTION

Figure 1:
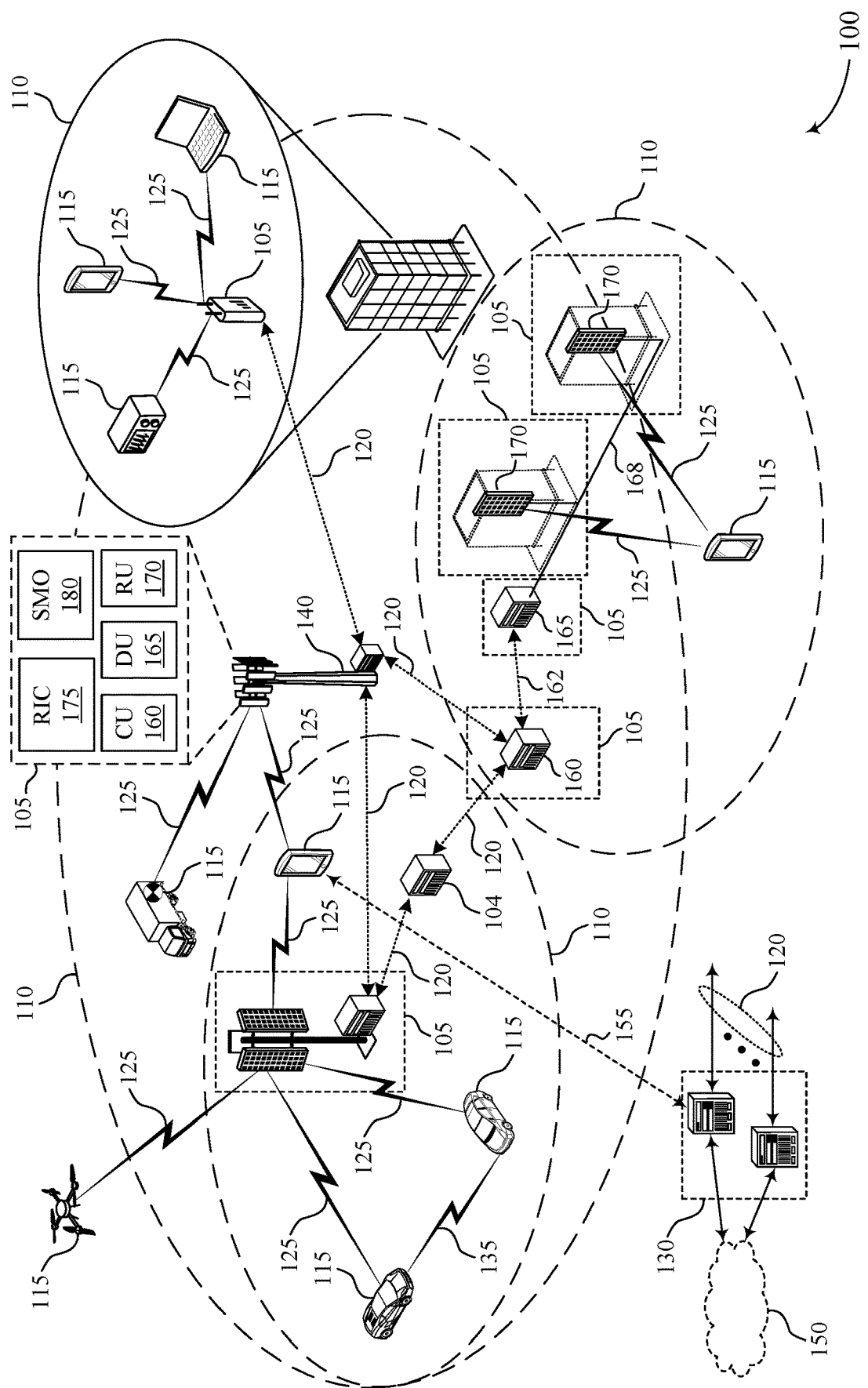
FIGS. 1 through 3 show examples of wireless communications systems that supports receiver alignment to enhance signal quality in near-field communications in accordance with one or more aspects of the present disclosure.

In some wireless communications systems, antenna array sizes (e.g., a quantity of antenna elements in the antenna array) are increased to support communication via relatively high frequency bands. In some cases, as antenna array sizes increase, some properties associated with wireless communication signals may change. For example, a transmitting device may be associated with both near-field and far-field communications, where a boundary between the near-field and far-field is defined according to a threshold distance (e.g., a Fraunhofer distance or a fraction such as 20%, 30%, 40%, 50%, 60%, 70%, or 80% of the Fraunhofer distance). Different array sizes may correspond to different threshold distances. For example, a larger array size may correspond to a larger threshold distance and thus create a larger distance range over which near-field communications prevails (e.g., is relevant). In at least some ranges of the near-field, properties of wireless communication signals may change (e.g., relative to the far-field or outer portions of the near-field), such that some antenna array orientations may be more efficient (e.g., receive a larger amount of signal energy) than other antenna array orientations.

For example, in far-field communication ranges (e.g., or outer regions of the near-field), an antenna array of a receiver may be oriented normal (e.g., perpendicular) to a radial direction of a transmitting antenna array (e.g., pointed at the center of the transmitter's antenna array) for improved efficiency (e.g., for a maximum energy transfer). However, some areas (e.g., close to the transmitter) in near-field communication ranges may have energy in directions other than the radial direction (e.g., in azimuth and zenith directions), and orienting the antenna array of the receiver normal to the radial direction may not be efficient (e.g., may not maximize the energy transfer between the transmitter and receiver). Due to increased antenna array sizes, the ranges near the transmitter associated with different communication properties may also increase, thus affecting an increased quantity of receivers (e.g., UEs, network nodes, or other wireless devices). However, communicating efficiently at near-field distances may lead to challenges that need to be solved efficiently.

In accordance with aspects described herein, a receiver may orient its antenna arrays based on signaling from a transmitter and a distance between the receiver and the transmitter (e.g., based on whether the receiver is within a threshold distance from the transmitter). In some examples, the transmitter may provide an indication of an orientation of its antenna array. For example, the indication may include a boresight direction (e.g., a direction normal to an antenna array) of the transmitting antenna array. The receiver may receive the indication and may determine the distance between the receiver and the transmitter. If the receiver is within a threshold distance (e.g., which may be determined by information transmitted by the transmitter) of the transmitter, the receiver may select an orientation for its antenna array that is normal to a boresight direction. That is, the receiver's antenna array may be oriented parallel to the transmitter's antenna array (e.g., and may not be pointed directly along a radial direction from the center of the transmitter array to the center of the receiver array). If the receiver is not within the threshold distance, the receiver may orient its antenna array normal to the radial direction between the center of the transmitter array and the center of the receiver array.

In other words, in the former orientation case, the receiver's antenna array may be oriented in (e.g., may have a boresight direction pointed in) a fixed direction that is parallel to the transmitter's antenna array (e.g., independent of the distance between the two arrays) as long as the distance is within the threshold distance. In the latter orientation case, where the distance exceeds the threshold distance, the receiver's antenna array may be oriented toward the transmitter's antenna array along a line-of-sight orientation. Thus, dynamically orienting an antenna based on a distance between a receiver and a transmitter as described herein may enable a wireless communications system to operate with increased reliability, increased spectral efficiency, decreased processing and signaling overhead, as well as provide an improved user experience.

Aspects of the disclosure are initially described in the context of wireless communications systems. Aspects of the disclosure are further illustrated by and described with reference to apparatus diagrams, system diagrams, and flowcharts that relate to receiver alignment to enhance signal quality in near-field communications.

FIG. 1 shows an example of a wireless communications system 100 that supports receiver alignment to enhance signal quality in near-field communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support receiver alignment to enhance signal quality in near-field communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, antenna array sizes (e.g., of a network entity 105, of a UEs 115, of some other wireless device) may increase to support high frequency communications. An increased array size at a transmitter may increase a threshold distance within which properties of wireless communication signals may change (e.g., relative to far-field distances or outer portions of near-field distance). For example, for a receiver outside the threshold distance to achieve a maximum energy transfer with the transmitter (e.g., far-field or outer regions of the near-field), a first boresight direction of a first antenna array at a receiver may be oriented along a radial direction of a second antenna array at the transmitter. For a receiver within the threshold distance to achieve a maximum energy transfer with the transmitter, the first boresight direction of the first antenna array at a receiver may be oriented along a second boresight direction of the second antenna array at the transmitter (e.g., the receiving antenna array may be parallel to the transmitting antenna array). However, communicating efficiently at near-field distances may provide challenges.

In accordance with aspects described herein, a receiver may orient its antenna arrays based on an orientation of one or more antenna arrays at a transmitter and a threshold distance value. In some examples, the transmitter may transmit an indication of the orientation of its antenna array (e.g., which may include a boresight direction). The receiver may receive the indication and may determine a distance between the receiver and the transmitter. Based on the indication and whether or not the receiver is within a threshold distance value (e.g., signaled by the transmitter), the receiver may select an orientation for its antenna array(s) (e.g., a first orientation or a second orientation). In some examples, the receiver may select a first orientation (e.g., oriented parallel to the antenna array of the transmitter) based on the distance failing to satisfy the threshold distance value and may select a second orientation (e.g., oriented along the radial direction of the transmitter) based on the distance satisfying the threshold distance value. Dynamically orienting an antenna array based on a distance between a receiver and a transmitter as described herein may enable a wireless communications system to operate with increased spectral efficiency and reduced processing and signaling overhead. For instance, when a device is within the threshold distance value it may select from a set of specified antenna orientations instead of measuring and reporting metrics for multiple orientation possibilities, resulting in decreased processing and signaling overhead.

Figure 2:
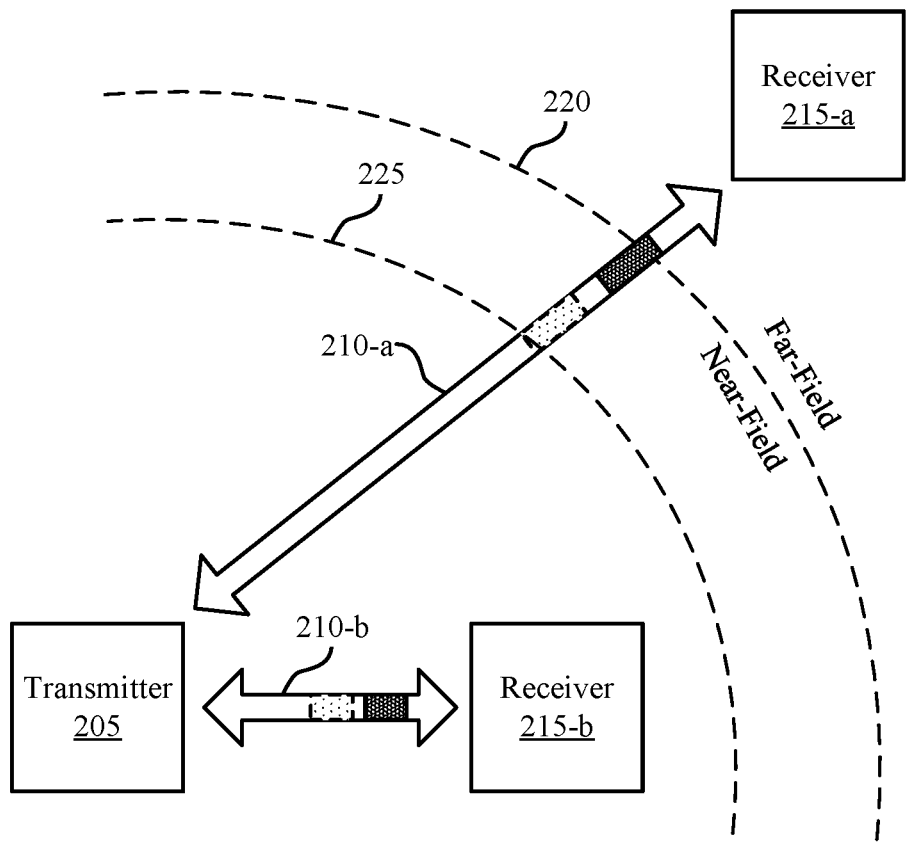

FIG. 2 shows an example of a wireless communications system 200 that supports receiver alignment to enhance signal quality in near-field communications in accordance with one or more aspects of the present disclosure. The wireless communications system 200 may include a transmitter 205 and one or more receivers 215 (e.g., a receiver 215-*a*, a receiver 215-*b*). In some examples, the transmitter 205 and the one or more receivers 215 may be examples of or include network entities 105, UEs 115, network nodes, or other wireless devices as described with reference to FIG. 1 (e.g., a transmitter 205 may be a network entity 105 and a receiver 215 may be a UE 115). The transmitter 205 and the one or more receivers 215 may communicate via respective communication links 210. For example, the transmitter 205 may communicate with the receiver 215-*a* via a communication link 210-*a* and may communicate with the receiver 215-*b* via a communication link 210-*b*.

Some wireless communications systems, such as the wireless communications system 200, may support communications in high frequency bands (e.g., frequency range 2 (FR2), millimeter wave systems). To support the high frequency bands, a wireless device (e.g., a transmitter 205, a receiver 215) may include an increased antenna array size (e.g., an increased quantity of antenna elements). In some cases, increasing an antenna array size may alter some characteristics of wireless communications associated with a wireless device. For instance, a boundary 220 (e.g., a Fraunhofer distance or some fraction such as 30% of the Fraunhofer distance) may define a boundary between a near-field communication distance (e.g., referred to as near-field range, near-field) and a far-field communication distance (e.g., referred to as far-field range, far-field) associated with a transmitter 205. In the near-field, signals associated with an electric field component (E field) and a magnetic field component (H field) may be independent of each other, and the wavefront may exhibit (e.g., show) a spherical behavior. In contrast, in the far-field, the E field may be linearly associated with H field, and the wavefront may exhibit (e.g., show) a planar behavior.

The boundary 220 may be based on a size (e.g., a quantity of antenna elements) of the antenna array at the transmitter 205. In some cases, as the antenna array size of the transmitter 205 increases, the boundary 220 may also increase (e.g., expand), resulting in an increased coverage area associated with the near-field communication distance. As an example, when communicating at a given frequency (e.g., 30 GHz), the boundary 220 may be approximately 20.5 meters for a 64-element antenna array (e.g., array along one dimension), and the boundary 220 may be approximately 81.9 meters for a 128-element antenna array. Thus, increased antenna array sizes may increase a quantity of receivers 215 that are included (e.g., affected by) in the near-field.

In some cases, communications in at least some portions of the near-field (e.g., within a threshold distance 225) may be associated with different communication characteristics than communications in the far-field (e.g., near-field communication behavior may be different than far-field communication behavior) or other portions of the near-field (e.g., between the threshold distance 225 and the boundary 220). For example, receivers 215 within the threshold distance 225 may experience different communication characteristics than receivers outside the threshold distance 225. In some cases, the threshold distance 225 may be associated with the boundary 220 (e.g., may be a percentage of the Fraunhofer distance such as 12.5%, 25%, 30%, or some other percentage), such that as the boundary 220 increases the threshold distance 225 may also increase. In some other cases, the threshold distance 225 may be the same as the boundary 220.

If a receiver 215 within the at least some portions of the near-field (e.g., within the threshold distance 225) do not compensate for the different communication characteristics, the receivers 215 may experience decreased efficiency and decreased communication quality, among other adverse effects. For example, some approximations (e.g., and assumptions) may be made for energy of wireless signals in the far-field (e.g., or outer portions of the near-field) which may not hold for wireless signals in at least some portions of the near-field (e.g., some signal components may be negligible in far-field but not in near-field). In some cases, a receiver 215 may not compensate for such differences and may accept such adverse effects.

In some cases, such as in far-field (e.g., or outer near-field) communications, a large portion (e.g., a majority) of transmit energy associated with a transmit (Tx) array (e.g., transmitting antenna array, transmitting antenna panel) of the transmitter 205 may be directed in a radial direction from the center of the Tx array. Thus, for example, a receiver 215-*a* may achieve a maximum energy transfer with the transmitter 205 by orienting (e.g., aligning) its receive (Rx) antenna array (e.g., an aperture of its Rx array, receiving antenna array, receiving antenna panel) normal to (e.g., at 90 degrees to) the radial direction to the center of a Tx array of the transmitter 205 (e.g., due to the large portion of energy being seen along the radial direction).

In at least some near-field range communications, however, significant energy of wireless signals (e.g., transmit energy from the transmitter 205) may be present (e.g., seen) in directions other than the radial direction of a Tx array. For example, energy may also be seen in azimuth and zenith directions relative to a Tx array and may also be based on beamforming parameters used by the transmitter 205. As such, orienting an Rx array of a receiver 215 (e.g., the receiver 215-b) in the near-field (e.g., within the threshold distance 225) normal to the radial direction of the Tx array of the transmitter 205 (e.g., as in the far-field case) may not achieve a maximum energy transfer between a transmitter 205 and the receiver 215 in the near-field.

In some cases, if a receiver 215 (e.g., a UE with multiple antenna modules or multiple antennas making an antenna module) does not properly compensate (e.g., orient its Rx array) for the near-field or far-field effects (e.g., based on its location relative to a transmitter 205), the receiver 215 may experience performance losses, power losses, and errors, among other adverse effects. For example, the receiver 215 may experience decreased array gain due to beamforming losses, scanning errors, or elemental gain drops. Such performance losses may, in some cases, be mitigated by beam scanning (e.g., different beams scanned in different directions) relative to the Rx array orientation of the receiver 215, however current techniques may not include mechanisms for a wireless device (e.g., a receiver 215, a transmitter 205) to dynamically adjust an orientation of an antenna array based on whether the wireless device is located in the near-field (e.g., within the threshold distance 225) or the far-field.

In accordance with aspects described herein, a transmitter 205 and a receiver 215 may exchange signaling to dynamically determine an orientation for their respective antenna arrays (e.g., Tx array(s), Rx array(s)) based on a distance between the transmitter 205 and the receiver 215. In some examples, a transmitter 205 may transmit a first indication 230 to a receiver 215, which may include an orientation (e.g., a boresight direction) of one or more antenna arrays at the transmitter 205. Based on receiving the indication, the receiver 215 may determine whether it is within a threshold distance 225 of the transmitter 205. The receiver 215 may orient (e.g., select an orientation for) one or more antenna arrays at the receiver 215 based on the first indication and whether it is within the threshold distance 225. Additionally, or alternatively, the transmitter 205 may transmit a second indication 235 to a receiver 215. The second indication 235 may include a value of the threshold distance 225, and the receiver may determine whether it is within the threshold distance 225 based on the second indication 235 (e.g., by calculating a distance and comparing to the threshold distance).

As an illustrative example, the receiver 215-a and the receiver 215-b may receive the first indication 230 (e.g., and the second indication 235) from the transmitter 205. The receiver 215-a may determine that it is not within the threshold distance 225 and may select a first orientation for its Rx array (e.g., normal to a radial direction of the Tx array). The receiver 215-b, however, may determine that it is within the threshold distance 225 and may select a second orientation (e.g., a low-complexity implementation) for its Rx array (e.g., normal to a boresight direction of the Tx array, parallel with the Tx array).

Dynamically orienting antenna arrays (Rx arrays relative to Tx arrays, Tx arrays relative to Rx arrays) of wireless devices as described herein may improve wireless communications by enabling devices to compensate for near-field and far-field effects. For example, a wireless device in the near-field may compensate for the energy distribution (e.g., different from the far-field) by dynamically adjusting its antenna array orientation. Additionally, the wireless device may re-adjust its orientation when transitioning from the near-field to the far-field to dynamically maintain a maximum energy transfer. Thus, the wireless device may thereby experience increased spectral efficiency, increased communication signal quality, among other benefits.

Figure 3:
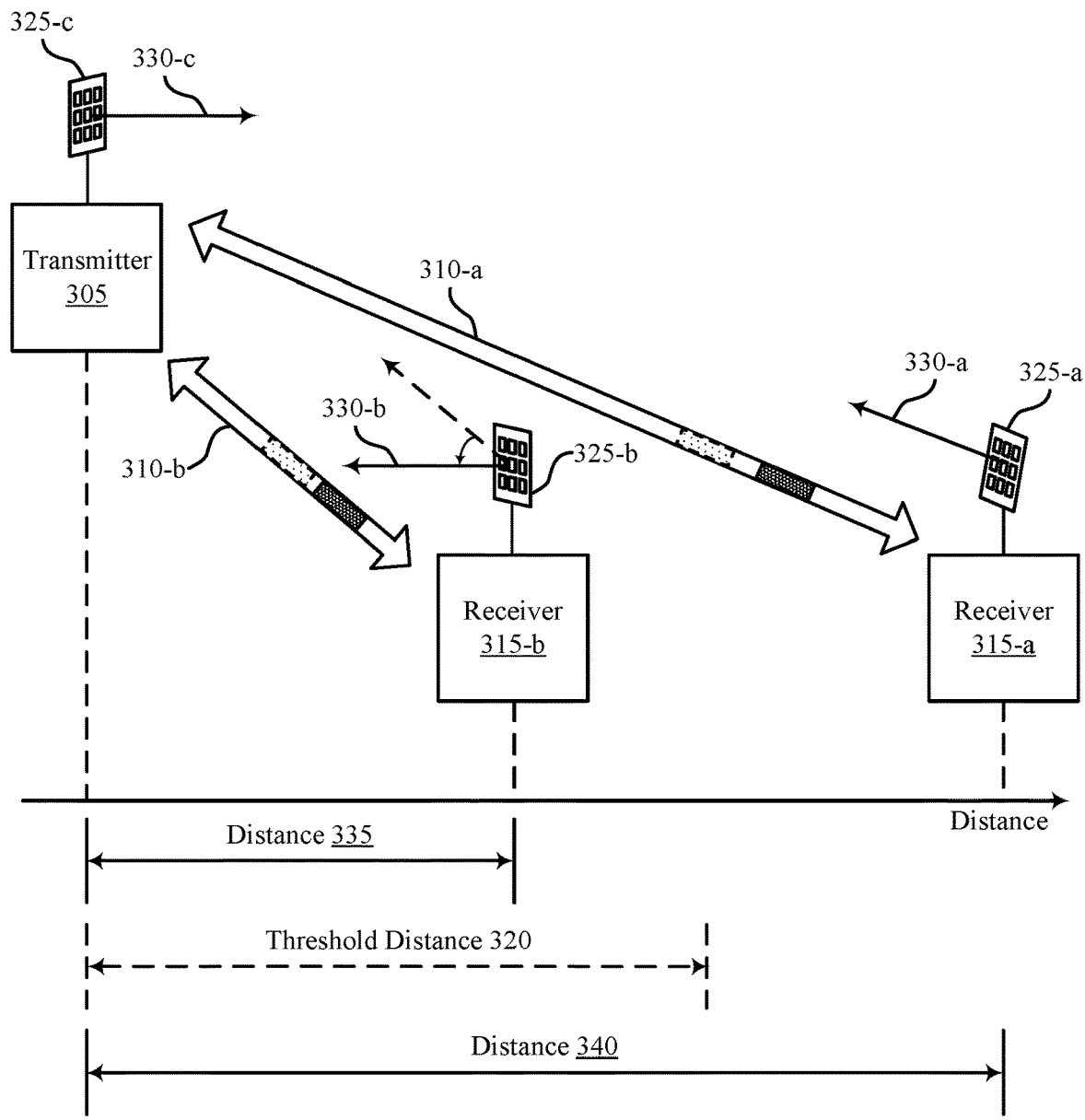

FIG. 3 shows an example of a wireless communications system 300 that supports receiver alignment to enhance signal quality in near-field communications in accordance with one or more aspects of the present disclosure. The wireless communications system 300 may include a transmitter 305 and one or more receivers 315 (e.g., a receiver 315-a, a receiver 315-b), which, in some cases, may be examples of a transmitter 205, one or more receivers 215, network entities 105, UEs 115, network nodes, or other wireless devices as described with reference to FIGS. 1 and 2. In some examples, a transmitter 305 may communicate with a receiver 315-a via a communication link 310-a and may communication with a receiver 315-b via a communication link 310-b. Each of the transmitter 305 and the one or more receivers 315 may include one or more antenna arrays 325. According to techniques herein, a receiver 315 (e.g., or a transmitter 305) may adjust an orientation of its antenna array 325 to improve communication quality with a transmitter 305 based on an indication from the transmitter 305 and a distance between the transmitter 305 and the receiver 315.

As discussed herein, a transmitter 305 may be associated with a near-field communication distance and a far-field communication distance. A boundary between the near-field and the far-field may change based on the size of an antenna array (e.g., a quantity of antenna elements) at the transmitter 305 (e.g., the boundary increases as the size of the antenna array increases). The transmitter 305 may communicate with a receiver 315-a in the far-field and a receiver 315-b in the near-field. Though two receivers are shown in the example of FIG. 3, it is to be understood that the transmitter 305 may communicate with any quantity of receivers in the near-field and the far-field. In some cases, the transmitter 305 may be an example of a network entity 105 and the one or more receivers 315 may be examples of UEs 115, however, both the transmitter 305 and the one or more receivers 315 may be examples of any wireless device for wireless communications (e.g., both the transmitter 305 and the receivers 315 may be respective UEs).

The transmitter 305, the receiver 315-a, and the receiver 315-b may each include respective antenna arrays 325 which may be used for communicating wireless signals (e.g., via a communication link 310). Though shown external to the respective devices, the antenna arrays 325 may, additionally, or alternatively, be located internal to (e.g., within) the respective devices. Each antenna array 325 may be associated with a respective boresight direction 330. The respective boresight directions 330 may refer to a direction normal to the surface of their associated antenna arrays 325. In some examples, a boresight direction 330 may be given by a Z-axis of an antenna array 325.

In some cases, wireless communication signals may be associated with different characteristics in some portions of the near-field (e.g., with a threshold distance 320) than in the far-field or other portions (e.g., outer portions) of the near-field. For instance, the energy of the signal may propagate with different characteristic properties (e.g., in different directions, with E fields and H fields being in different relative orientations to each other) within the threshold distance 320 than outside the threshold distance 320. For communications outside the threshold distance 320 (e.g., to ensure optimal energy flow), the receiver 315-a may orient its antenna array 325-a normal to a radial direction of an antenna array 325-c of the transmitter 305. That is, the antenna array 325-a may align its boresight direction 330-a along the radial direction of the antenna array 325-c. Thus, the boresight direction 330-a may point directly at the center of the antenna array 325-c (e.g., an Rx aperture of the receiver 315-a may be normal to a radial vector of the antenna array 325-c).

The receiver 315-b may also orient its antenna array 325-b normal to the radial direction of the antenna array 325-c, however, because the receiver 315-b is within the threshold distance 320, there may be significant energy associated with transmission of signals from the transmitter 305 in directions other than the radial direction. Thus, orienting the antenna array 325-b normal to the radial direction of the antenna array 325-c may not efficiently transfer energy between the receiver 315-b and the transmitter 305. In some examples (in low-complexity implementations), to improve efficiency of communications within the threshold distance 320, the receiver 315-b may select to orient the antenna array 325-b parallel to the orientation of the antenna array 325-c of the transmitter 305 (e.g., the antenna array 325-b may be oriented normal to a Z-axis of the transmitter 305, or some other pre-specified direction). That is, the boresight direction 330-b and the boresight direction 330-c may be parallel or pointed along a same direction. Such orientations may more efficiently receive the energy dispersed in the directions other than the radial direction. However, some techniques may not have any mechanism for a receiver 315 to determine when to adjust the orientation of its antenna array 325.

In accordance with techniques herein, a receiver 315 may orient (e.g., select an orientation for) one or more antenna arrays 325 based on signaling with a transmitter 305 and a distance relative to the transmitter 305. For example, the transmitter 305 may transmit a first indication 345 (e.g., via system information message, via sidelink control information (SCI)) to a receiver 315 that includes a first orientation of the antenna array 325-c. The first indication 345 may include an indication of the boresight direction 330-c (e.g., in a global or local coordinate system). In some examples, selecting an orientation for an antenna array 325 may include selecting different antenna modules (e.g., antenna subarrays) of the antenna array 325 to use for transmission (e.g., selecting different combinations of antenna modules to steer or direct communication signals).

Based on receiving the first indication, the receiver 315 may compare a distance between the receiver 315 and the transmitter 305 to a threshold distance 320 and may select an orientation for its antenna array(s) 325. The threshold distance 320 may be determined by the transmitter 305, by the receiver 315, or both. The receiver 315 may select an orientation from a set of orientations (e.g., pre-specified orientations). In some examples, the set may include a first orientation where an antenna array 325 is oriented normal to a radial direction of the transmitter 305 (e.g., the orientation of the antenna array 325-a), a second orientation where an antenna array 325 is oriented normal to the boresight direction 330-c of the transmitter 305 (e.g., the orientation of antenna array 325-b), some other orientation, or any combination thereof.

In some examples, the transmitter 305 may additionally transmit a second indication 350 which may include the threshold distance 320 (e.g., the transmitter 305 may configure the threshold distance 320 and transmit the second indication 350). In such examples, the receiver 315 may select the orientation based on the second indication. The receiver may perform a comparison of the distance between the receiver 315 and the transmitter 305 to the threshold distance 320. In some examples, the receiver 315 may determine the distance to the transmitter 305 based on a signal measurement (e.g., receive signal strength, a reference signal received power, or some other reference signal), a positioning protocol, some other technique, or a combination thereof. In some examples, the threshold distance 320 may include threshold distances along multiple directions (e.g., in an X-Y-Z or an r-θ-φ local or global coordinate system) such as a first threshold distance (e.g., $T_x$) for a first direction, a second threshold distance (e.g., $T_y$) for a second direction, and a third threshold distance (e.g., $T_z$) for a third direction, and so on. Additionally, or alternatively, the threshold distance 320 may include a radial threshold distance (e.g., $R_{thresh}$, in a spherical coordinate system).

As an illustrative example, a distance 340 between the receiver 315-a (e.g., the antenna array 325-a) and the transmitter 305 (e.g., the antenna array 325-c) may be greater than (e.g., may satisfy) the threshold distance 320. The receiver 315-a may compare the distance 340 to the threshold distance 320 and may determine to select a first orientation for the antenna array 325-a, such that the antenna array 325-a is oriented normal to the radial direction between the receiver 315-a and the transmitter 305. In another example, a distance 335 between the receiver 315-b and the transmitter 305 may be less than (e.g., may fail to satisfy) the threshold distance 320. The receiver 315-b may compare the distance 335 to the threshold distance 320 and may determine to select a second orientation for the antenna array 325-b, such that the antenna array 325-b is oriented parallel to the orientation of the antenna array 325-c (e.g., normal to the boresight direction 330-c of the antenna array 325-c). In some examples, the threshold distance 320 may be proportionately (e.g., fractionally) related to the boundary between the near-field and the far-field (e.g., the Fraunhofer distance).

In some examples, a receiver 315 may not be capable of orienting (e.g., selecting an orientation for) its antenna array 325 (e.g., the receiver 315 may be associated with a fixed orientation for its antenna array 325). In such examples, the receiver 315 may not adjust an orientation of its antenna array 325 and may transmit an indication to the transmitter 305 to indicate a performance loss (e.g., a loss relative to a performance using an ideal orientation). In some examples, based on receiving the indication from the receiver 315, the transmitter 305 may determine to re-orient its antenna array 325-c, increase a transmit power, perform some other corrective action, or any combination thereof. Additionally, or alternatively, a receiver 315 may generate an alert message for a user (e.g., from an application layer program). The alert message may include an instruction for the user to re-orient its antenna array(s) 325 according to a selected antenna orientation.

Selecting orientations for antenna arrays 325 as described herein may decrease processing and signaling overhead for some procedures (e.g., antenna selection) in wireless communications systems. For example, a receiver 315 that is within the threshold distance 320 may select from a limited quantity of antenna orientations (e.g., configurations) rather than performing more extensive antenna selection procedures (e.g., beam selection, beam sounding, beam reporting). Further, the techniques herein may enable wireless devices to increase reliability and spectral efficiency for both near-field and far-field communications by dynamically orienting its antenna arrays.

Figure 4:
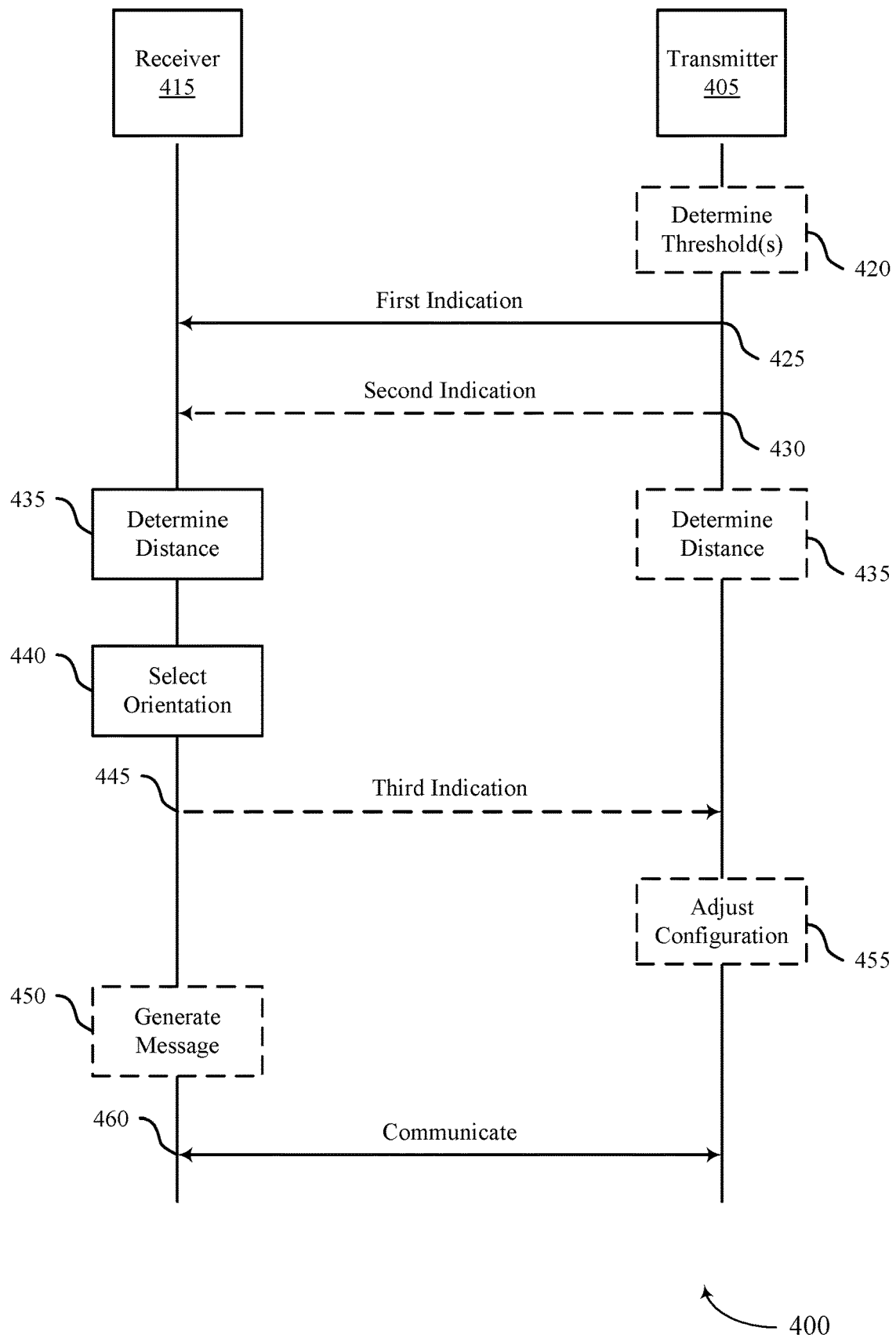
FIG. 4 shows an example of a process flow that supports receiver alignment to enhance signal quality in near-field communications in accordance with one or more aspects of the present disclosure.

FIG. 4 shows an example of a process flow 400 that supports receiver alignment to enhance signal quality in near-field communications in accordance with one or more aspects of the present disclosure. In some examples, process flow 400 may implement aspects of the wireless communications system 100, the wireless communications system 200, and the wireless communications system 300. For example, the process flow 400 may support signaling between a receiver 415 and a transmitter 405 to enable dynamic selection of antenna array orientation. The receiver 415 and the transmitter 405 of the process flow 400 may be examples of corresponding devices herein, including with reference to FIGS. 1 through 3.

In the following description of process flow 400, the operations between the receiver 415 and the transmitter 405 may be performed in a different order than the order shown, or other operations may be added or removed from the process flow 400. For example, some operations may also be left out of process flow 400, or may be performed in different orders or at different times. Further, although some operations or signaling may be shown to occur at different times for discussion purposes, these operations may actually occur at the same time. Although the receiver 415 and the transmitter 405 are shown performing the operations of process flow 400, some aspects of some operations may also be performed by one or more other wireless or network devices.

At 420, the transmitter 405 may determine one or more threshold values for the threshold distance (e.g., a threshold distance 320). For example, the transmitter 405 may determine a value based on a size of an antenna array at the transmitter 405 (e.g., a first antenna array). In some examples, the size of the antenna array at the transmitter 405 may be associated with a boundary distance (e.g., a Fraunhofer distance) between a near-field communication range and a far-field communication range. In some examples, the value may be determined based on a proportion of the boundary distance.

At 425, the receiver 415 may receive an indication of a first orientation of a first antenna array of a transmitter 405. In some examples, the indication of the first orientation may include a boresight direction of the first antenna array of the transmitter 405. The indication may provide the orientation with reference to a local or global coordinate system (e.g., a vector orientation in an X-Y-Z coordinate system, an angular orientation in a spherical coordinate system, or both). In some examples, the indication of the first orientation may be received via a system information message, a control information message (e.g., downlink control information (DCI), uplink control information (UCI), SCI, medium access control-control element (MAC-CE)), some other signaling, or any combination thereof.

At 430, the receiver 415 may additionally receive a second indication from the transmitter 405 including the threshold distance (e.g., a value of the threshold distance, an indicator associated with a value of the threshold distance). In some examples, the threshold distance may include a first threshold distance for a first direction (e.g., an X direction), a second threshold distance for a second direction (e.g., a Y direction), a third distance for a third direction (e.g., a Z direction), or a combination thereof. Additionally, or alternatively, the threshold distance may include a threshold value associated with a radial threshold distance (e.g., a radial distance in a spherical coordinate system).

At 435, the receiver 415, the transmitter 405, or both may determine the distance between the receiver 415 and the transmitter 405. In some examples, the distance may be determined by calculating a first location of the receiver 415 and a second location of the transmitter 405 based on a positioning protocol. The positioning protocol may be associated with a local coordinate system, a global coordinate system, or both. The receiver 415 may use the determined distance for a comparison with the threshold distance.

At 440, the receiver 415 may select a second orientation for an antenna array of the receiver 415 (e.g., a second antenna array) for communications. In some examples, the selection may be based on the first orientation of the transmitter 405 (e.g., indicated in the first indication) and the comparison of the distance between the receiver and the transmitter 405 to the threshold distance (e.g., one or more threshold distance values). Additionally, the second orientation may be based on receiving the second indication. The receiver 415 may select the second orientation from a set of orientations (e.g., a set of pre-configured orientations).

In some examples, the second orientation may be parallel to the first orientation of the transmitter 405 (e.g., a Tx array of the transmitter 405) based on the distance between the receiver and the transmitter 405 failing to satisfy the threshold distance. That is, a boresight direction of the receiver 415 may be oriented along a boresight direction of the transmitter 405 (e.g., the boresight directions of the receiver 415 and the transmitter 405 may not point directly at one another, but may be parallel).

In some other examples, the second orientation may be normal to a radial direction between the transmitter 405 and the receiver 415 based on the distance between the receiver and the transmitter 405 satisfying the threshold distance (e.g., the receiver 415 may be outside the threshold distance). That is, a boresight direction of the receiver 415 may be oriented along a radial direction of the transmitter 405 (e.g., the boresight directions of the receiver 415 may point directly to the center of the first antenna array of the transmitter 405).

In some examples, the second antenna array of the receiver 415 may include multiple subarrays. In such examples, selecting the second orientation for the second antenna array may include selecting one or more of the multiple subarrays to use for the communications based on the second orientation. For example, the receiver 415 may select a subarray of the multiple subarrays that has a closest orientation to having a boresight parallel with the boresight of the antenna of the transmitter. Additionally, or alternatively, various combinations of the multiple subarrays may be selected to provide the second orientation for communication signals associated with the second antenna array.

At 445, the receiver 415 may transmit a third indication of a performance loss to the transmitter 405 based on failing to orient the second antenna array according to the second orientation. For example, the receiver 415 may not be capable of orienting the second antenna array. Thus, the receiver 415 may indicate a performance loss relative to using the second orientation (e.g., an ideal orientation for the second antenna array).

At 450, the transmitter 405 may adjust its transmit configuration (e.g., based on receiving the third indication of the performance loss). In some examples, (e.g., if the transmitter 405 is capable of adjusting an orientation of its antenna array(s)) the transmitter 405 may adjust the first antenna array to operate according to a third orientation (e.g., may orient its boresight direction along a radial direction or along a boresight direction of the receiver 415) different than the first orientation based on receive the third indication of the performance loss. Additionally, or alternatively, the transmitter 405 may increase a transmit power for the first antenna array based on receive the third indication of the performance loss.

At 455, the receiver 415 may generate an alert message for a user (e.g., the receiver 415 may not be autonomously capable of re-orienting the second antenna panel). In some examples, the alert message may come from an application layer program and may include an instruction to orient the second antenna array according to the second orientation.

At 460, the receiver 415 may communicate with the transmitter 405 via the second antenna array of the receiver 415 and the first antenna array of the transmitter 405. For example, the receiver 415 may communicate with the transmitter 405 based on receiving the first indication, the second indication, or both from the transmitter 405 and selecting the second orientation for the second antenna array. The transmitter 405 may, in some examples, communicate with the receiver 415 in accordance with orienting the first antenna array (e.g., according to the third orientation at 455), in accordance with an increased transmit power for communications, or both.

Figure 5:
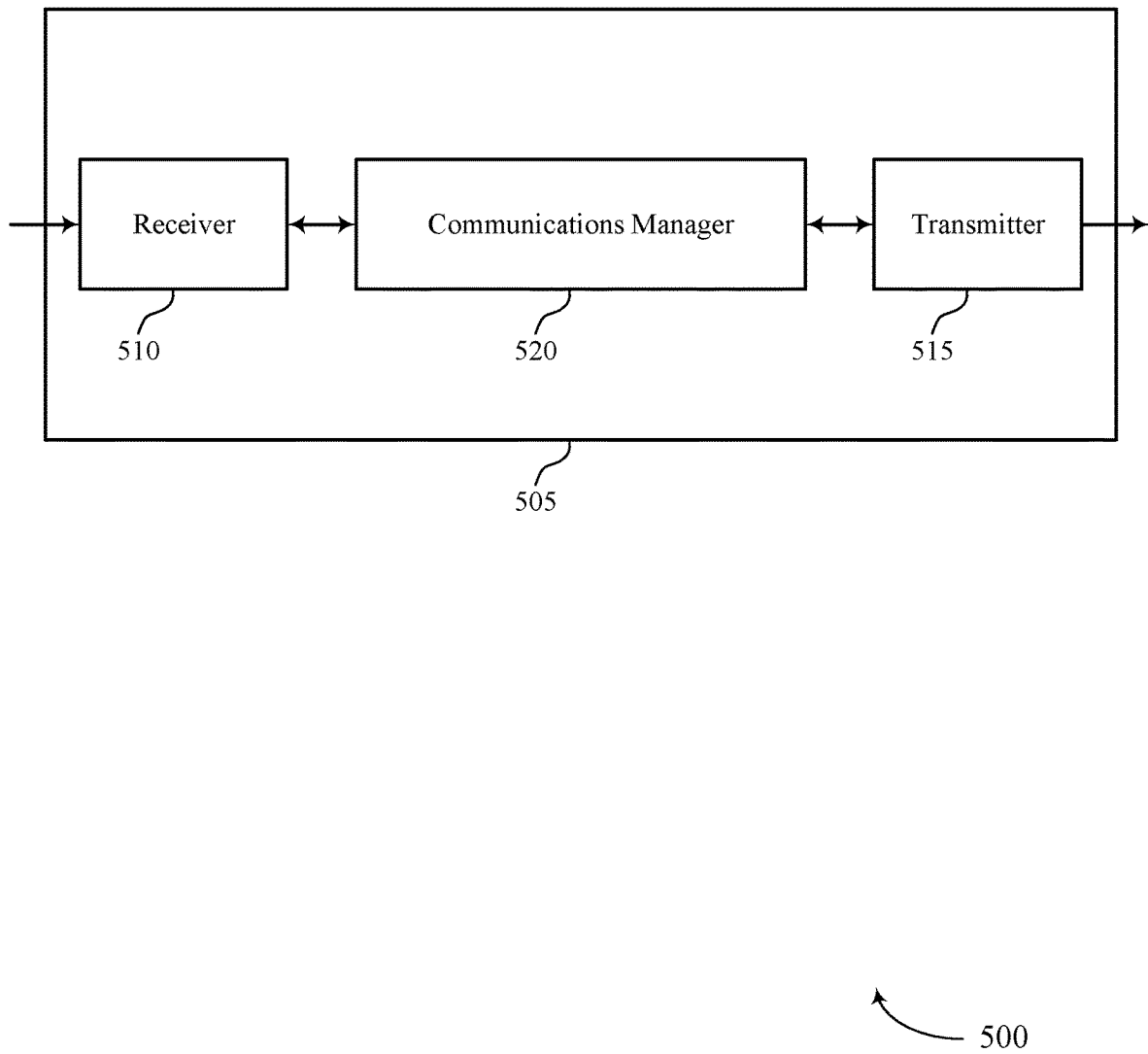
FIGS. 5 and 6 show block diagrams of devices that support receiver alignment to enhance signal quality in near-field communications in accordance with one or more aspects of the present disclosure.

FIG. 5 shows a block diagram 500 of a device 505 that supports receiver alignment to enhance signal quality in near-field communications in accordance with one or more aspects of the present disclosure. The device 505 may be an example of aspects of a receiver as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to receiver alignment to enhance signal quality in near-field communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to receiver alignment to enhance signal quality in near-field communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of receiver alignment to enhance signal quality in near-field communications as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications by a receiver in accordance with examples as disclosed herein. For example, the communications manager 520 is capable of, configured to, or operable to support a means for receiving an indication of a first orientation of a first antenna array of a transmitter. The communications manager 520 is capable of, configured to, or operable to support a means for communicating with the transmitter via a second antenna array of the receiver, where a second orientation of the second antenna array for the communicating is selected based on the first orientation and a comparison of a distance between the receiver and the transmitter to a threshold distance.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for increased reliability, reduced processing, reduced power consumption, and more efficient utilization of communication resources.

Figure 6:
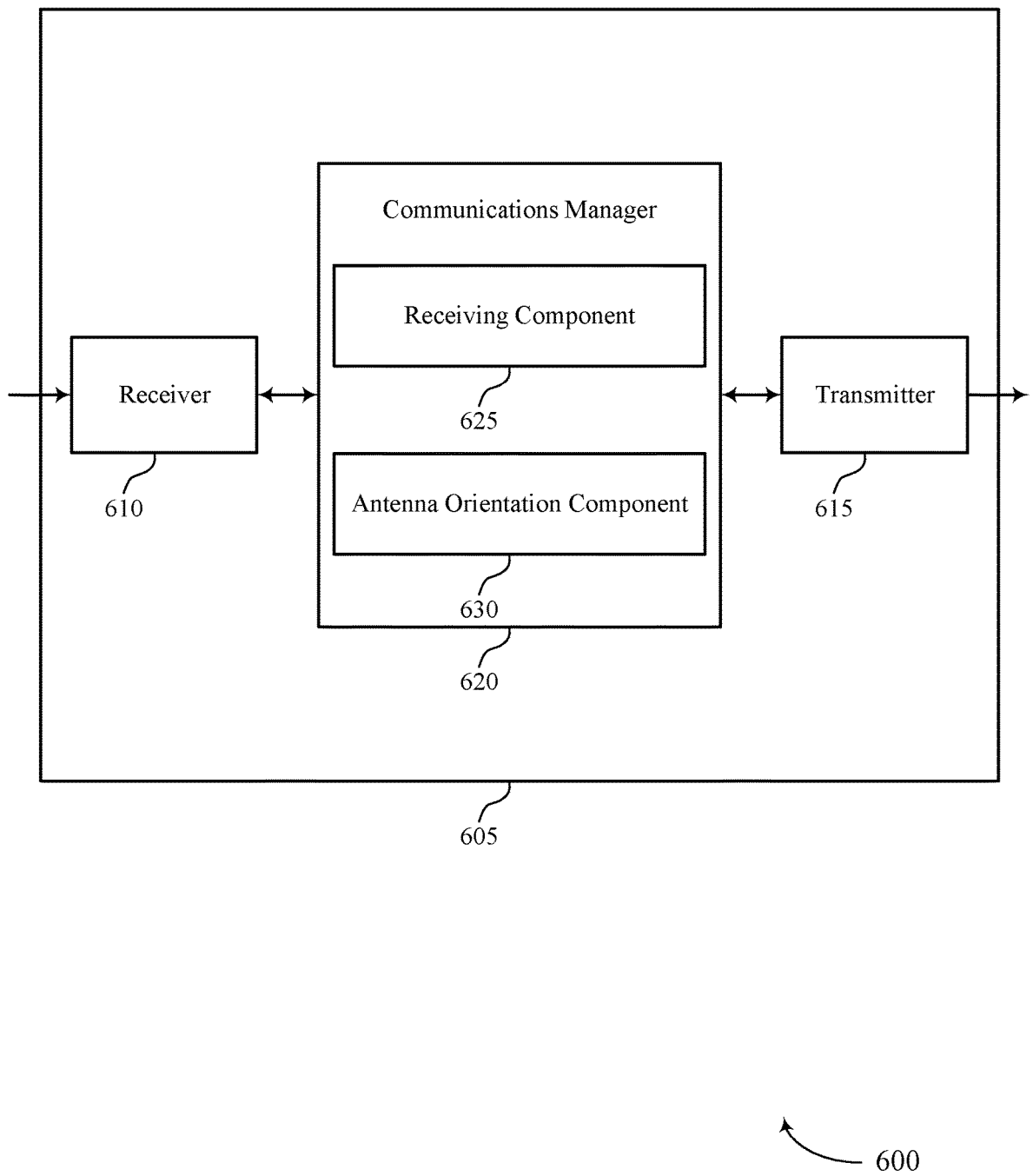

FIG. 6 shows a block diagram 600 of a device 605 that supports receiver alignment to enhance signal quality in near-field communications in accordance with one or more aspects of the present disclosure. The device 605 may be an example of aspects of a device 505 or a receiver (e.g., a receiver 315) as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques.

Each of these components may be in communication with one another (e.g., via one or more buses).

The receiver 610 may provide a means for receiving information such as packets, user data, control information, or any combination thereof associated with various information channels (e.g., control channels, data channels, information channels related to receiver alignment to enhance signal quality in near-field communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to receiver alignment to enhance signal quality in near-field communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of receiver alignment to enhance signal quality in near-field communications as described herein. For example, the communications manager 620 may include a receiving component 625 an antenna orientation component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications by a receiver in accordance with examples as disclosed herein. The receiving component 625 is capable of, configured to, or operable to support a means for receiving an indication of a first orientation of a first antenna array of a transmitter. The antenna orientation component 630 is capable of, configured to, or operable to support a means for communicating with the transmitter via a second antenna array of the receiver, where a second orientation of the second antenna array for the communicating is selected based on the first orientation and a comparison of a distance between the receiver and the transmitter to a threshold distance.

Figure 7:
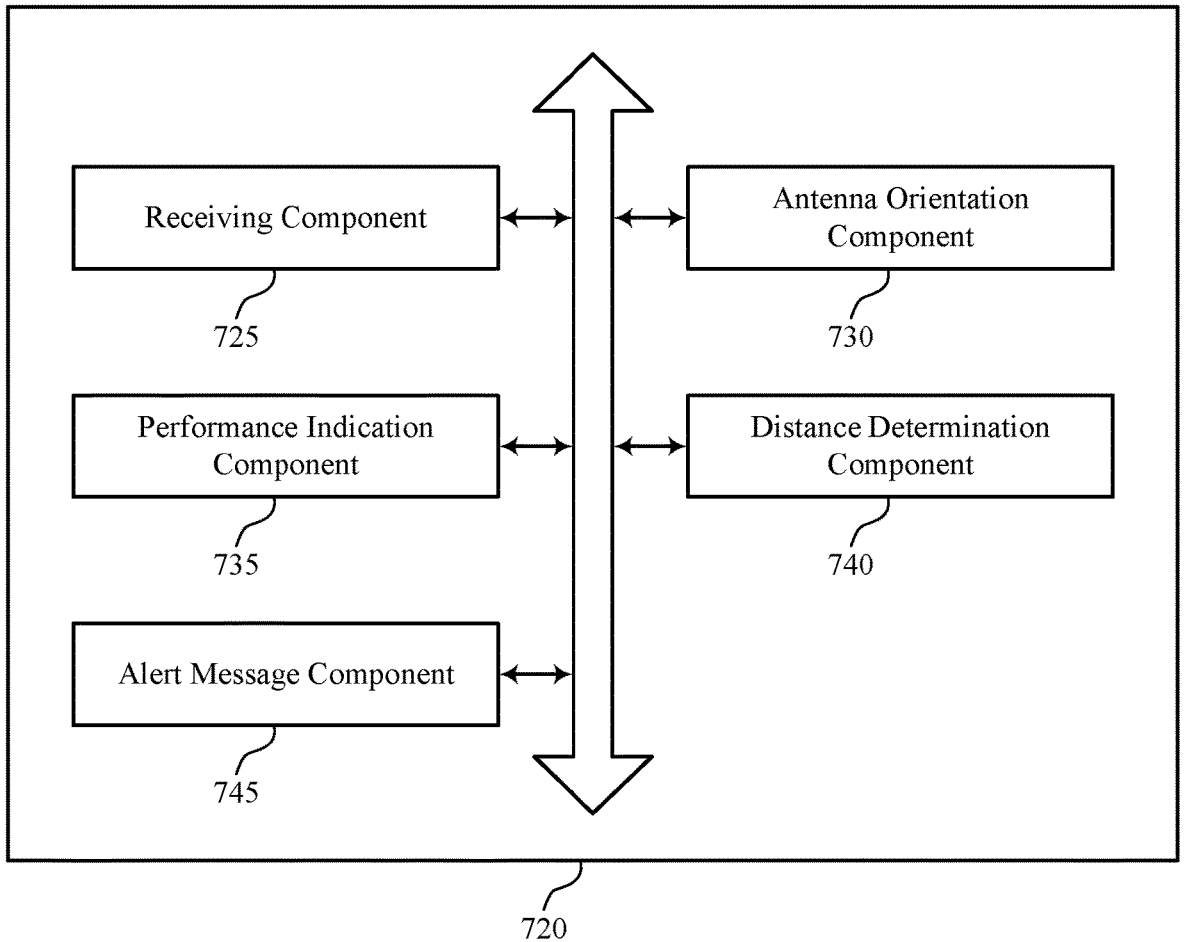
FIG. 7 shows a block diagram of a communications manager that supports receiver alignment to enhance signal quality in near-field communications in accordance with one or more aspects of the present disclosure.

FIG. 7 shows a block diagram 700 of a communications manager 720 that supports receiver alignment to enhance signal quality in near-field communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of receiver alignment to enhance signal quality in near-field communications as described herein. For example, the communications manager 720 may include a receiving component 725, an antenna orientation component 730, a performance indication component 735, a distance determination component 740, an alert message component 745, or any combination thereof. Each of these components, or components or subcomponents thereof (e.g., one or more processors, one or more memories), may communicate, directly or indirectly, with one another (e.g., via one or more buses).

The communications manager 720 may support wireless communications by a receiver in accordance with examples as disclosed herein. The receiving component 725 is capable of, configured to, or operable to support a means for receiving an indication of a first orientation of a first antenna array of a transmitter. In some examples, the indication of the first orientation is received via a system information message, a control information message, or both. In some examples, the indication of the first orientation includes a boresight direction of the first antenna array. The antenna orientation component 730 is capable of, configured to, or operable to support a means for communicating with the transmitter via a second antenna array of the receiver, where a second orientation of the second antenna array for the communicating is selected based on the first orientation and a comparison of a distance between the receiver and the transmitter to a threshold distance.

In some examples, the receiving component 725 is capable of, configured to, or operable to support a means for receiving a second indication from the transmitter including the threshold distance, where the second orientation is based on the second indication. In some examples, the threshold distance is based on a size of the first antenna array. In some examples, the threshold distance includes a first threshold distance for a first direction, a second threshold distance for a second direction, a third distance for a third direction, or a combination thereof. In some examples, the threshold distance includes a first threshold value associated with a radial threshold distance.

In some examples, the second orientation is parallel to the first orientation based on the distance between the receiver and the transmitter failing to satisfy the threshold distance. In some examples, the second orientation is normal to a radial direction between the transmitter and the receiver based on the distance between the receiver and the transmitter satisfying the threshold distance.

In some examples, the second antenna array may include multiple subarrays, where, to support selecting the second orientation, the antenna orientation component 730 is capable of, configured to, or operable to support a means for selecting one or more of the subarrays of the multiple subarrays to use for the communicating based on the second orientation.

In some examples, the performance indication component 735 is capable of, configured to, or operable to support a means for transmitting an indication of a performance loss to the transmitter based on failing to orient the second antenna array according to the second orientation.

In some examples, the alert message component 745 is capable of, configured to, or operable to support a means for generating an alert message for a user, the alert message coming from an application layer program and including an instruction to orient the second antenna array according to the second orientation.

In some examples, the distance determination component 740 is capable of, configured to, or operable to support a means for determining the distance between the receiver and the transmitter by calculating a first location of the receiver and a second location of the transmitter based on a positioning protocol, the positioning protocol associated with a local coordinate system, a global coordinate system, or both.

Figure 8:
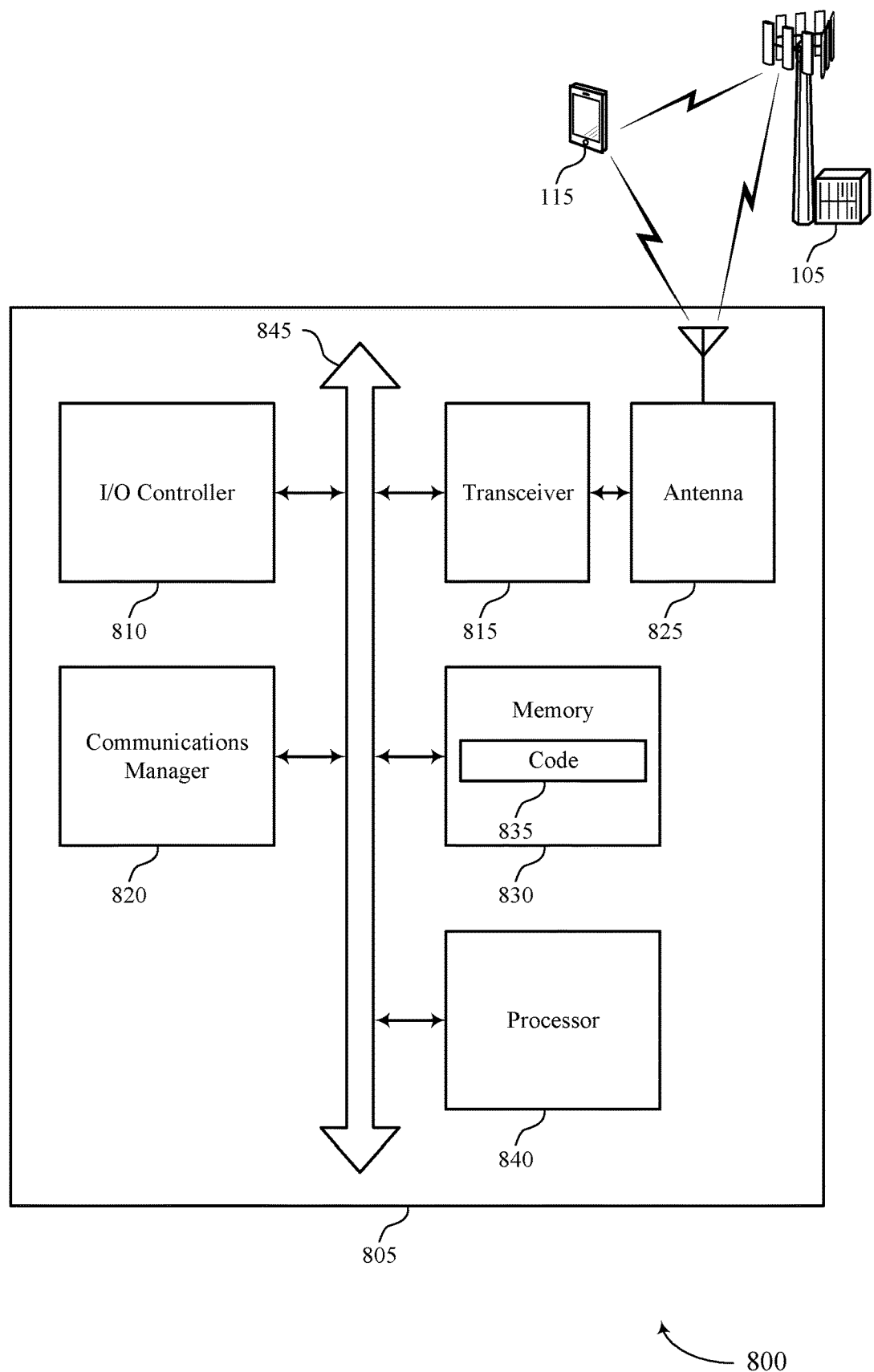
FIG. 8 shows a diagram of a system including a device that supports receiver alignment to enhance signal quality in near-field communications in accordance with one or more aspects of the present disclosure.

FIG. 8 shows a diagram of a system 800 including a device 805 that supports receiver alignment to enhance signal quality in near-field communications in accordance with one or more aspects of the present disclosure. The device 805 may be an example of or include the components of a device 505, a device 605, or a receiver as described herein. The device 805 may include components for bi-directional voice and data communications including components for transmitting and receiving communications, such as a communications manager 820, an I/O controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include RAM and ROM. The at least one memory 830 may store computer-readable, computer-executable code 835 (e.g., processor-executable code) including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a BIOS which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting receiver alignment to enhance signal quality in near-field communications). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications by a receiver in accordance with examples as disclosed herein. For example, the communications manager 820 is capable of, configured to, or operable to support a means for receiving an indication of a first orientation of a first antenna array of a transmitter. The communications manager 820 is capable of, configured to, or operable to support a means for communicating with the transmitter via a second antenna array of the receiver, where a second orientation of the second antenna array for the communicating is selected based on the first orientation and a comparison of a distance between the receiver and the transmitter to a threshold distance.

By including or configuring the communications manager 820 in accordance with examples as described herein, the device 805 may support techniques for improved communication reliability, improved user experience related to reduced processing, reduced power consumption, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of receiver alignment to enhance signal quality in near-field communications as described herein, or the at least one processor 840 and the at least one memory 830 may be otherwise configured to, individually or collectively, perform or support such operations.

Figure 9:
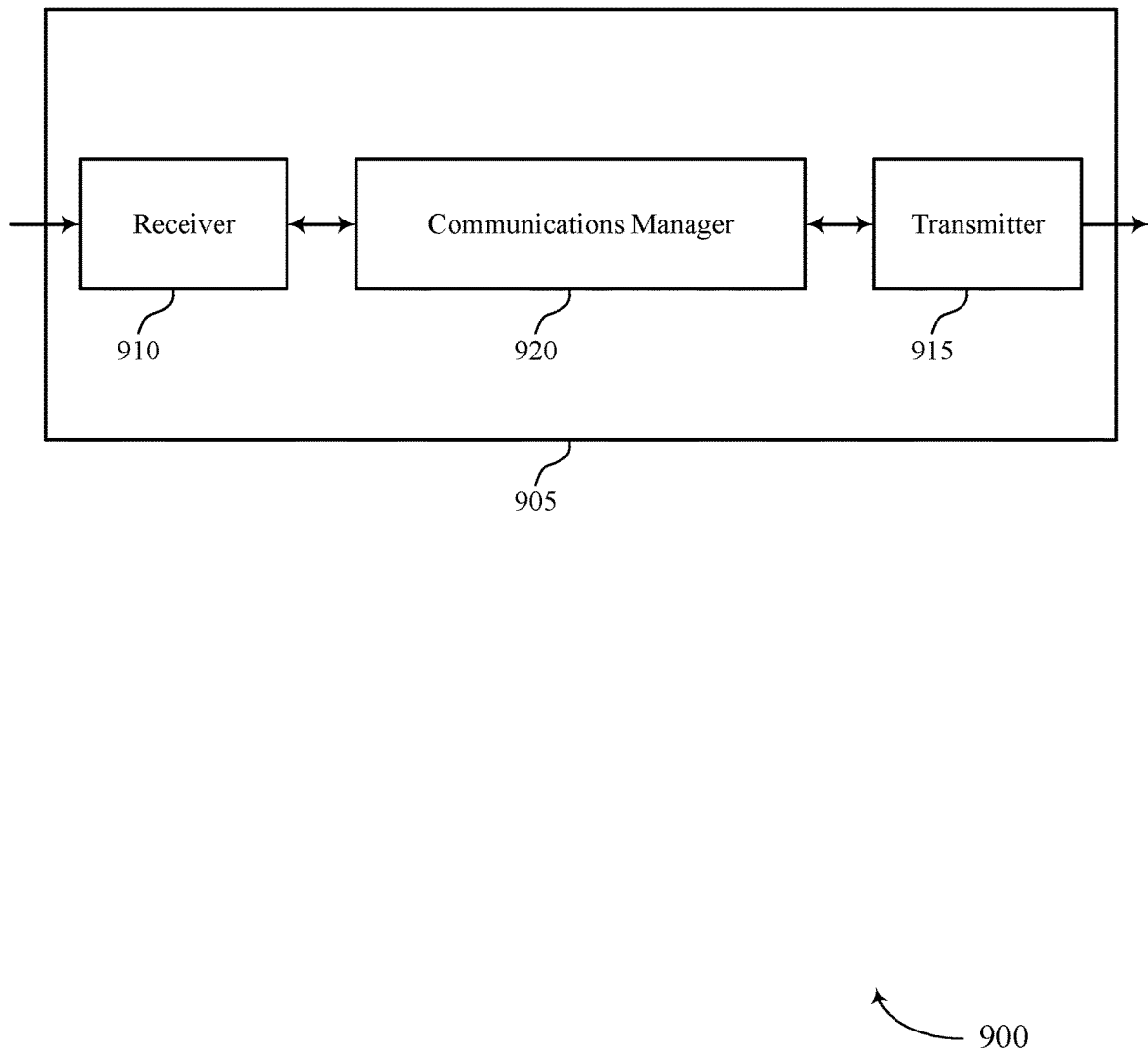
FIGS. 9 and 10 show block diagrams of devices that support receiver alignment to enhance signal quality in near-field communications in accordance with one or more aspects of the present disclosure.

FIG. 9 shows a block diagram 900 of a device 905 that supports receiver alignment to enhance signal quality in near-field communications in accordance with one or more aspects of the present disclosure. The device 905 may be an example of aspects of a transmitter as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of receiver alignment to enhance signal quality in near-field communications as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications by a transmitter in accordance with examples as disclosed herein. For example, the communications manager 920 is capable of, configured to, or operable to support a means for transmitting an indication of a first orientation of a first antenna array of the transmitter. The communications manager 920 is capable of, configured to, or operable to support a means for communicating with a receiver via a second antenna array of the receiver, where a second orientation of the second antenna array for the communicating is based on the first orientation and a comparison of a distance between the transmitter and the receiver to a threshold distance.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources.

Figure 10:
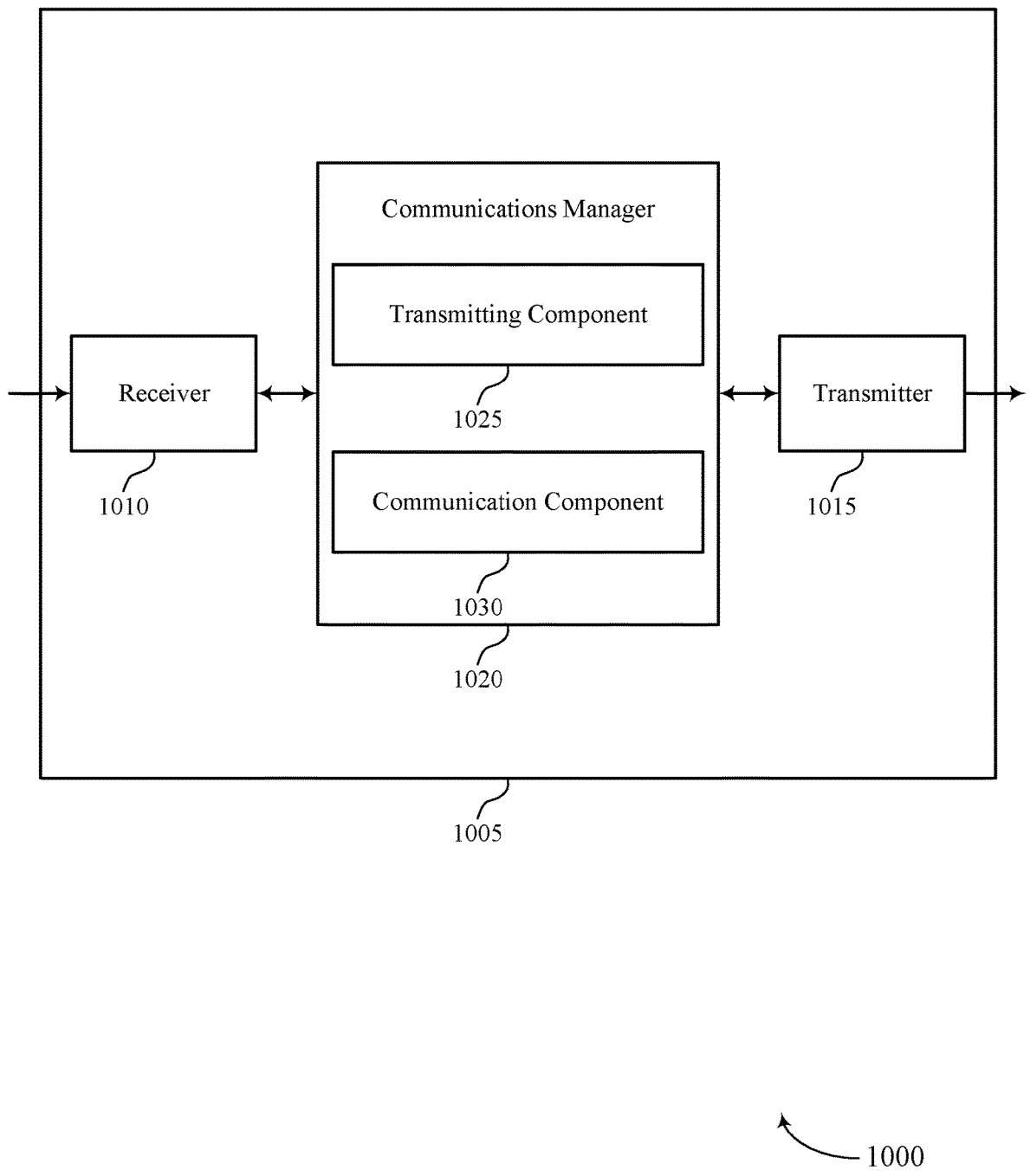

FIG. 10 shows a block diagram 1000 of a device 1005 that supports receiver alignment to enhance signal quality in near-field communications in accordance with one or more aspects of the present disclosure. The device 1005 may be an example of aspects of a device 905 or a transmitter (e.g., a transmitter 305) as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas.

Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of receiver alignment to enhance signal quality in near-field communications as described herein. For example, the communications manager 1020 may include a transmitting component 1025 a communication component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications by a transmitter in accordance with examples as disclosed herein. The transmitting component 1025 is capable of, configured to, or operable to support a means for transmitting an indication of a first orientation of a first antenna array of the transmitter. The communication component 1030 is capable of, configured to, or operable to support a means for communicating with a receiver via a second antenna array of the receiver, where a second orientation of the second antenna array for the communicating is based on the first orientation and a comparison of a distance between the transmitter and the receiver to a threshold distance.

Figure 11:
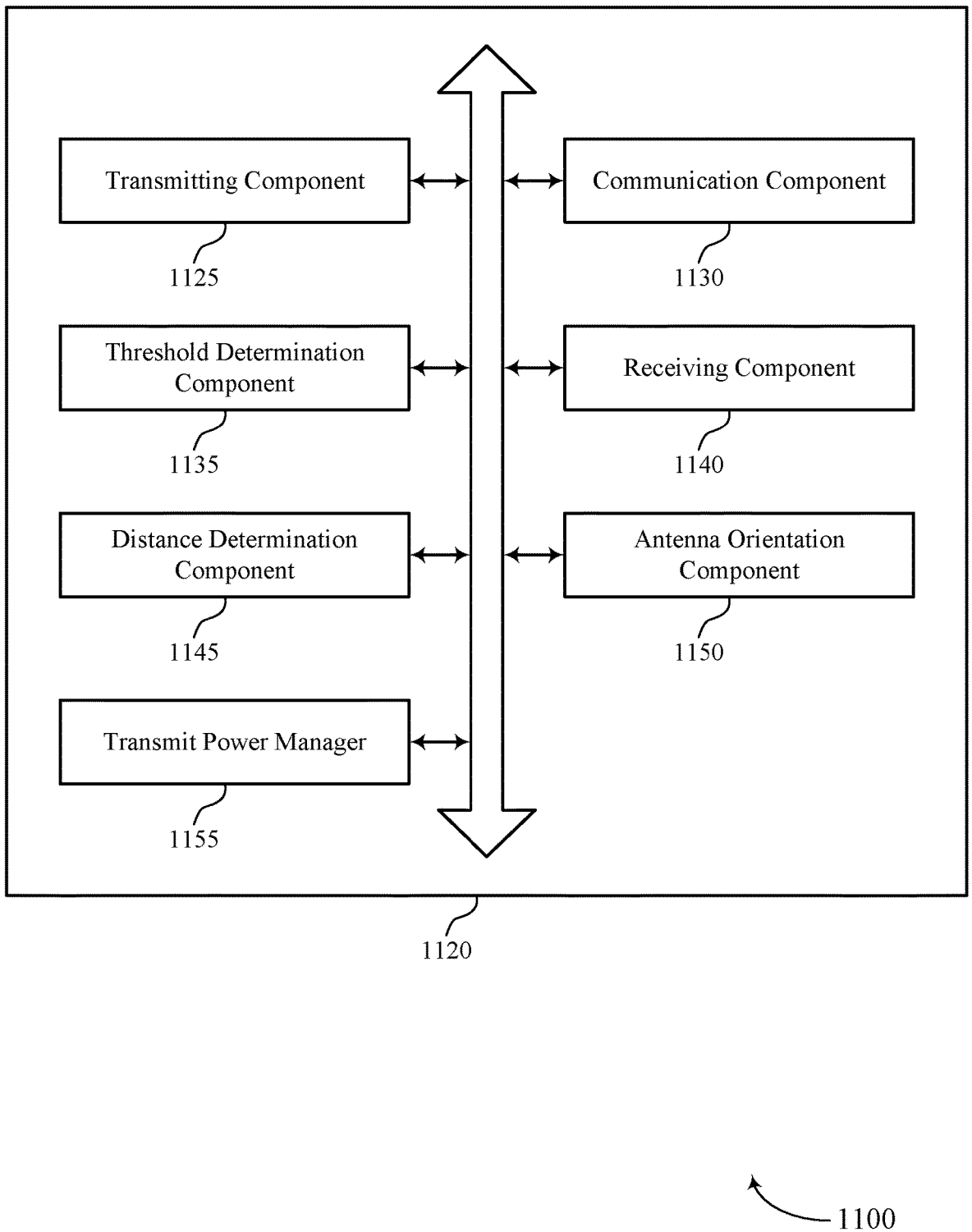
FIG. 11 shows a block diagram of a communications manager that supports receiver alignment to enhance signal quality in near-field communications in accordance with one or more aspects of the present disclosure.

FIG. 11 shows a block diagram 1100 of a communications manager 1120 that supports receiver alignment to enhance signal quality in near-field communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of receiver alignment to enhance signal quality in near-field communications as described herein. For example, the communications manager 1120 may include a transmitting component 1125, a communication component 1130, a threshold determination component 1135, a receiving component 1140, a distance determination component 1145, an antenna orientation component 1150, a transmit power manager 1155, or any combination thereof. Each of these components, or components or subcomponents thereof (e.g., one or more processors, one or more memories), may communicate, directly or indirectly, with one another (e.g., via one or more buses).

The communications manager 1120 may support wireless communications by a transmitter in accordance with examples as disclosed herein. The transmitting component 1125 is capable of, configured to, or operable to support a means for transmitting an indication of a first orientation of a first antenna array of the transmitter. In some examples, the indication of the first orientation is transmitted via a system information message, a control information message, or both. In some examples, the indication of the first orientation includes a boresight direction of the first antenna array. The communication component 1130 is capable of, configured to, or operable to support a means for communicating with a receiver via a second antenna array of the receiver, where a second orientation of the second antenna array for the communicating is based on the first orientation and a comparison of a distance between the transmitter and the receiver to a threshold distance.

In some examples, the threshold determination component 1135 is capable of, configured to, or operable to support a means for determining a value for the threshold distance. In some examples, the transmitting component 1125 is capable of, configured to, or operable to support a means for transmitting, from the transmitter to the receiver, a second indication including the threshold distance, where the second orientation is based on the second indication. In some examples, determining the value for the threshold distance is based on a size of the first antenna array.

In some examples, the threshold distance includes a first threshold distance for a first direction, a second threshold distance for a second direction, a third distance for a third direction, or a combination thereof. In some examples, the threshold distance includes a first threshold value associated with a radial threshold distance.

In some examples, the second orientation is parallel to the first orientation based on the distance between the receiver and the transmitter failing to satisfy the threshold distance. In some examples, the second orientation is normal to a radial direction between the transmitter and the receiver based on the distance between the receiver and the transmitter satisfying the threshold distance.

In some examples, the receiving component 1140 is capable of, configured to, or operable to support a means for receiving an indication of a performance loss from the receiver based on the receiver failing to orient the second antenna array according to the second orientation.

In some examples, the antenna orientation component 1150 is capable of, configured to, or operable to support a means for adjusting the first antenna array to operate according to a third orientation different than the first orientation based on receiving the indication of the performance loss. In some examples, the communication component 1130 is capable of, configured to, or operable to support a means for communicating with the receiver via the first antenna array and the second antenna array of the receiver.

In some examples, the transmit power manager 1155 is capable of, configured to, or operable to support a means for increasing a transmit power for the first antenna array based on receiving the indication of the performance loss. In some examples, the communication component 1130 is capable of, configured to, or operable to support a means for communicating with the receiver in accordance with increasing the transmit power.

In some examples, the distance determination component 1145 is capable of, configured to, or operable to support a means for determining the distance between the receiver by calculating a first location of the transmitter and a second location of the receiver based on a positioning protocol, the positioning protocol associated with a local coordinate system, a global coordinate system, or both.

Figure 12:
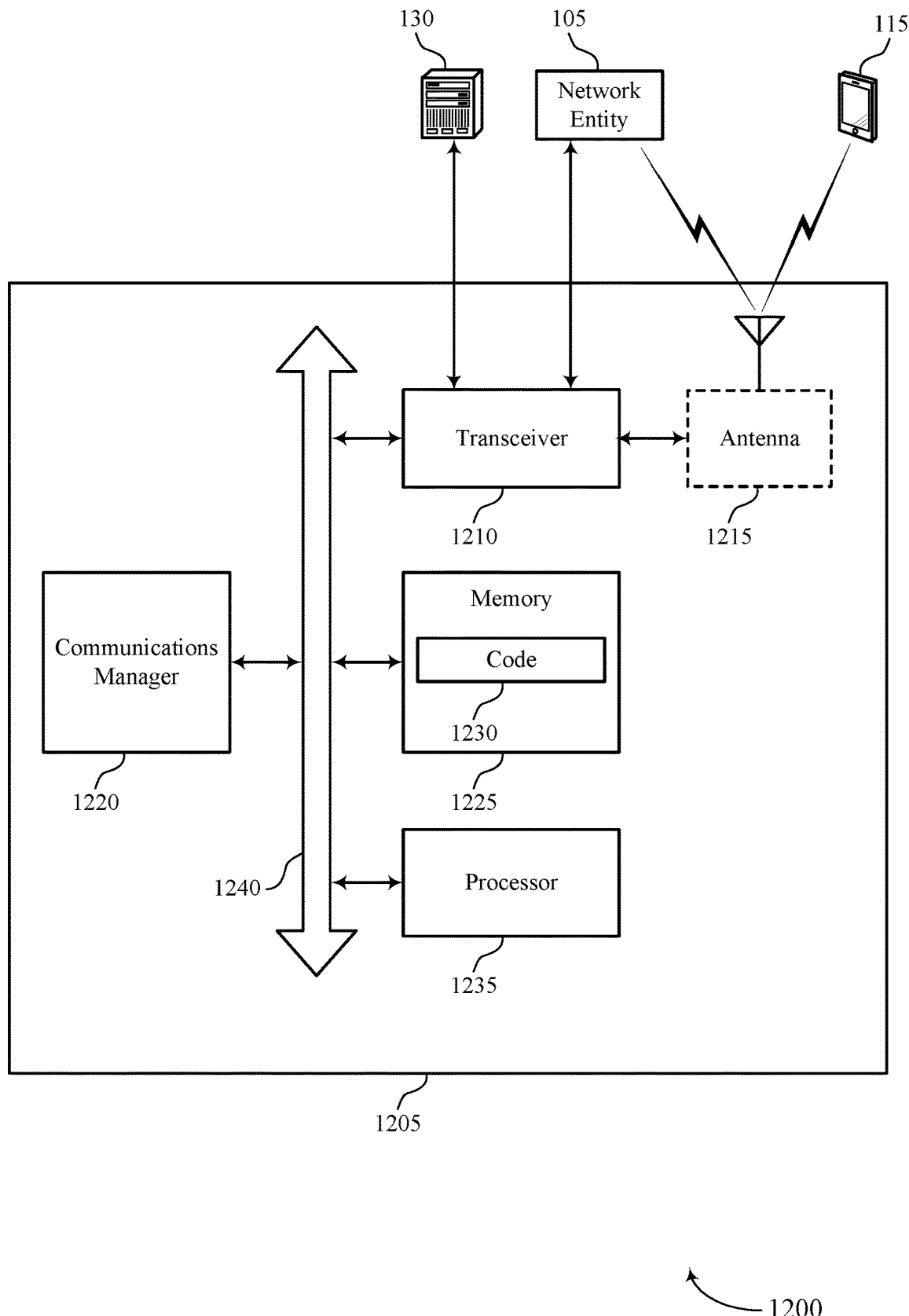
FIG. 12 shows a diagram of a system including a device that supports receiver alignment to enhance signal quality in near-field communications in accordance with one or more aspects of the present disclosure.

FIG. 12 shows a diagram of a system 1200 including a device 1205 that supports receiver alignment to enhance signal quality in near-field communications in accordance with one or more aspects of the present disclosure. The device 1205 may be an example of or include the components of a device 905, a device 1005, or a transmitter as described herein. The device 1205 may include components for bi-directional voice and data communications including components for transmitting and receiving communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 (e.g., processor-executable code) including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting receiver alignment to enhance signal quality in near-field communications). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications by a transmitter in accordance with examples as disclosed herein. For example, the communications manager 1220 is capable of, configured to, or operable to support a means for transmitting an indication of a first orientation of a first antenna array of the transmitter. The communications manager 1220 is capable of, configured to, or operable to support a means for communicating with a receiver via a second antenna array of the receiver, where a second orientation of the second antenna array for the communicating is based on the first orientation and a comparison of a distance between the transmitter and the receiver to a threshold distance.

By including or configuring the communications manager 1220 in accordance with examples as described herein, the device 1205 may support techniques for improved communication reliability, improved user experience related to reduced processing, reduced power consumption, more efficient utilization of communication resources, improved coordination between devices, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of receiver alignment to enhance signal quality in near-field communications as described herein, or the at least one processor 1235 and the at least one memory 1225 may be otherwise configured to, individually or collectively, perform or support such operations.

Figure 13:
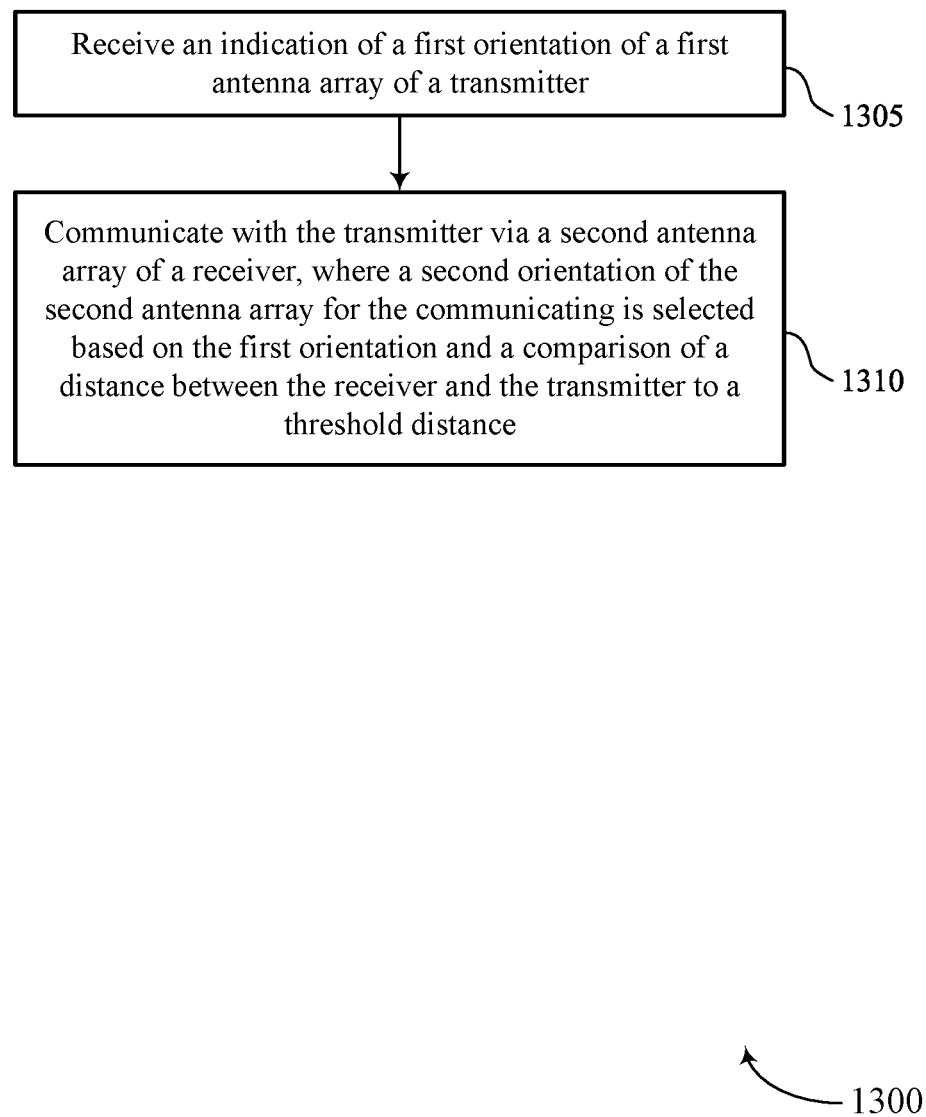
FIGS. 13 through 16 show flowcharts illustrating methods that support receiver alignment to enhance signal quality in near-field communications in accordance with one or more aspects of the present disclosure.

FIG. 13 shows a flowchart illustrating a method 1300 that supports receiver alignment to enhance signal quality in near-field communications in accordance with aspects of the present disclosure. The operations of the method 1300 may be implemented by a receiver or its components as described herein. For example, the operations of the method 1300 may be performed by a receiver as described with reference to FIGS. 1 through 8. In some examples, a receiver may execute a set of instructions to control the functional elements of the receiver to perform the described functions. Additionally, or alternatively, the receiver may perform aspects of the described functions using special-purpose hardware.

At 1305, the method may include receiving an indication of a first orientation of a first antenna array of a transmitter. The operations of block 1305 may be performed in accordance with examples as disclosed herein. In some examples, aspects of the operations of 1305 may be performed by a receiving component 725 as described with reference to FIG. 7.

At 1310, the method may include communicating with the transmitter via a second antenna array of a receiver, where a second orientation of the second antenna array for the communicating is selected based on the first orientation and a comparison of a distance between the receiver and the transmitter to a threshold distance. The operations of block 1310 may be performed in accordance with examples as disclosed herein. In some examples, aspects of the operations of 1310 may be performed by an antenna orientation component 730 as described with reference to FIG. 7.

Figure 14:
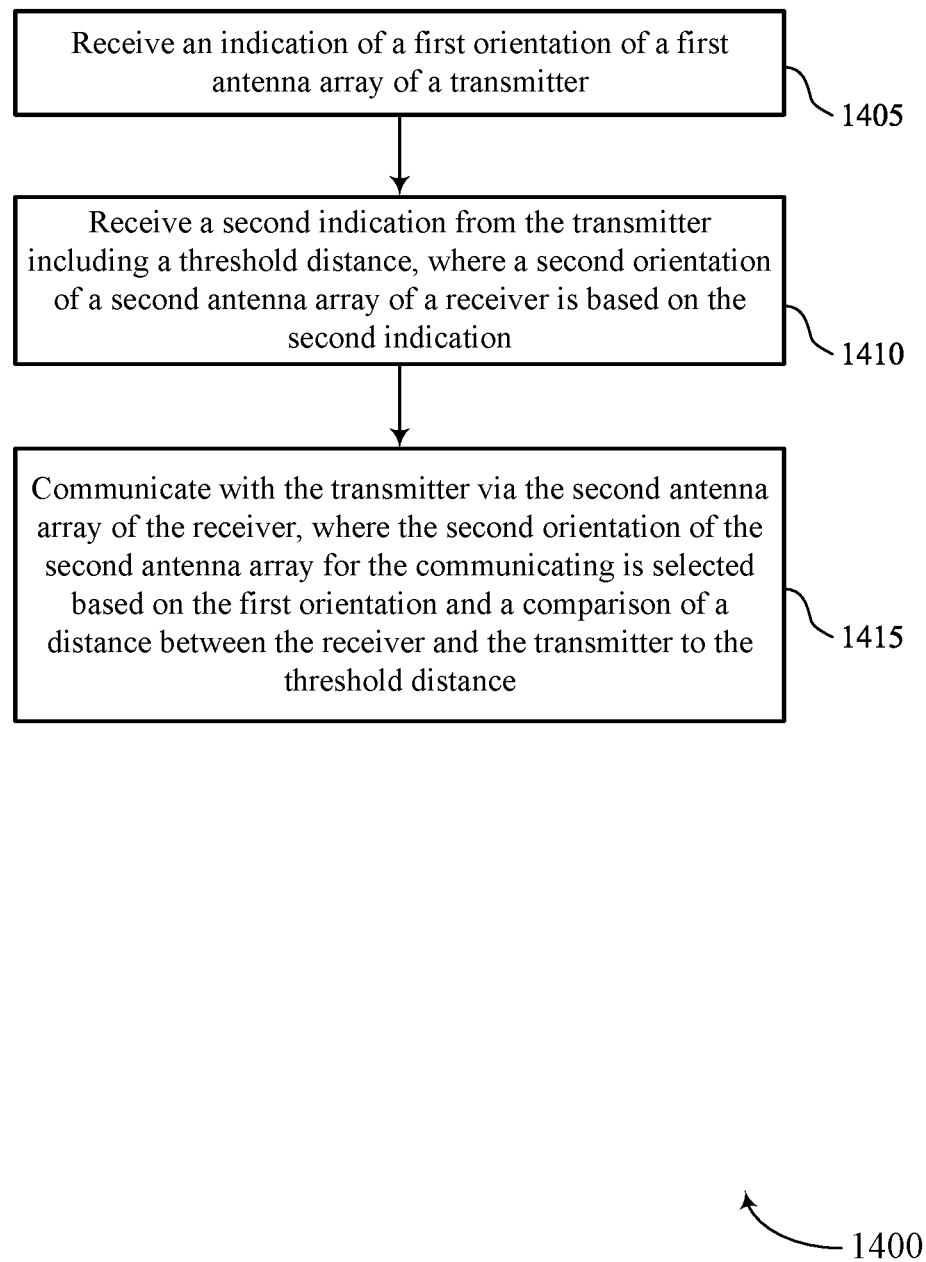

FIG. 14 shows a flowchart illustrating a method 1400 that supports receiver alignment to enhance signal quality in near-field communications in accordance with aspects of the present disclosure. The operations of the method 1400 may be implemented by a receiver or its components as described herein. For example, the operations of the method 1400 may be performed by a receiver as described with reference to FIGS. 1 through 8. In some examples, a receiver may execute a set of instructions to control the functional elements of the receiver to perform the described functions.

Additionally, or alternatively, the receiver may perform aspects of the described functions using special-purpose hardware.

At 1405, the method may include receiving an indication of a first orientation of a first antenna array of a transmitter. The operations of block 1405 may be performed in accordance with examples as disclosed herein. In some examples, aspects of the operations of 1405 may be performed by a receiving component 725 as described with reference to FIG. 7.

At 1410, the method may include receiving a second indication from the transmitter including a threshold distance, where a second orientation of a second antenna array of a receiver is based on the second indication. The operations of block 1410 may be performed in accordance with examples as disclosed herein. In some examples, aspects of the operations of 1410 may be performed by a receiving component 725 as described with reference to FIG. 7.

At 1415, the method may include communicating with the transmitter via the second antenna array of the receiver, where the second orientation of the second antenna array for the communicating is selected based on the first orientation and a comparison of a distance between the receiver and the transmitter to the threshold distance (e.g., received via the second indication). The operations of block 1415 may be performed in accordance with examples as disclosed herein. In some examples, aspects of the operations of 1415 may be performed by an antenna orientation component 730 as described with reference to FIG. 7.

Figure 15:
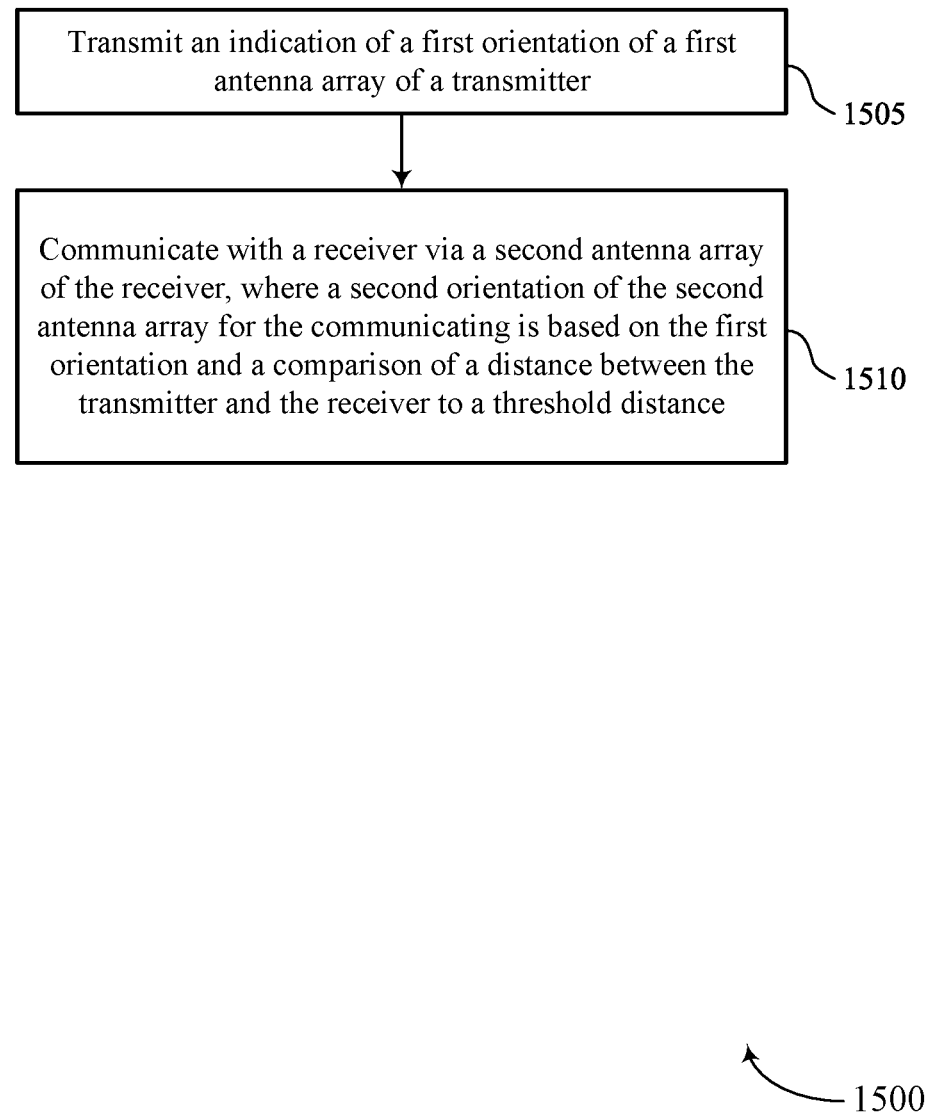

FIG. 15 shows a flowchart illustrating a method 1500 that supports receiver alignment to enhance signal quality in near-field communications in accordance with aspects of the present disclosure. The operations of the method 1500 may be implemented by a transmitter or its components as described herein. For example, the operations of the method 1500 may be performed by a transmitter as described with reference to FIGS. 1 through 4 and 9 through 12. In some examples, a transmitter may execute a set of instructions to control the functional elements of the transmitter to perform the described functions. Additionally, or alternatively, the transmitter may perform aspects of the described functions using special-purpose hardware.

At 1505, the method may include transmitting an indication of a first orientation of a first antenna array of a transmitter. The operations of block 1505 may be performed in accordance with examples as disclosed herein. In some examples, aspects of the operations of 1505 may be performed by a transmitting component 1125 as described with reference to FIG. 11.

At 1510, the method may include communicating with a receiver via a second antenna array of the receiver, where a second orientation of the second antenna array for the communicating is based on the first orientation and a comparison of a distance between the transmitter and the receiver to a threshold distance. The operations of block 1510 may be performed in accordance with examples as disclosed herein. In some examples, aspects of the operations of 1510 may be performed by a communication component 1130 as described with reference to FIG. 11.

Figure 16:
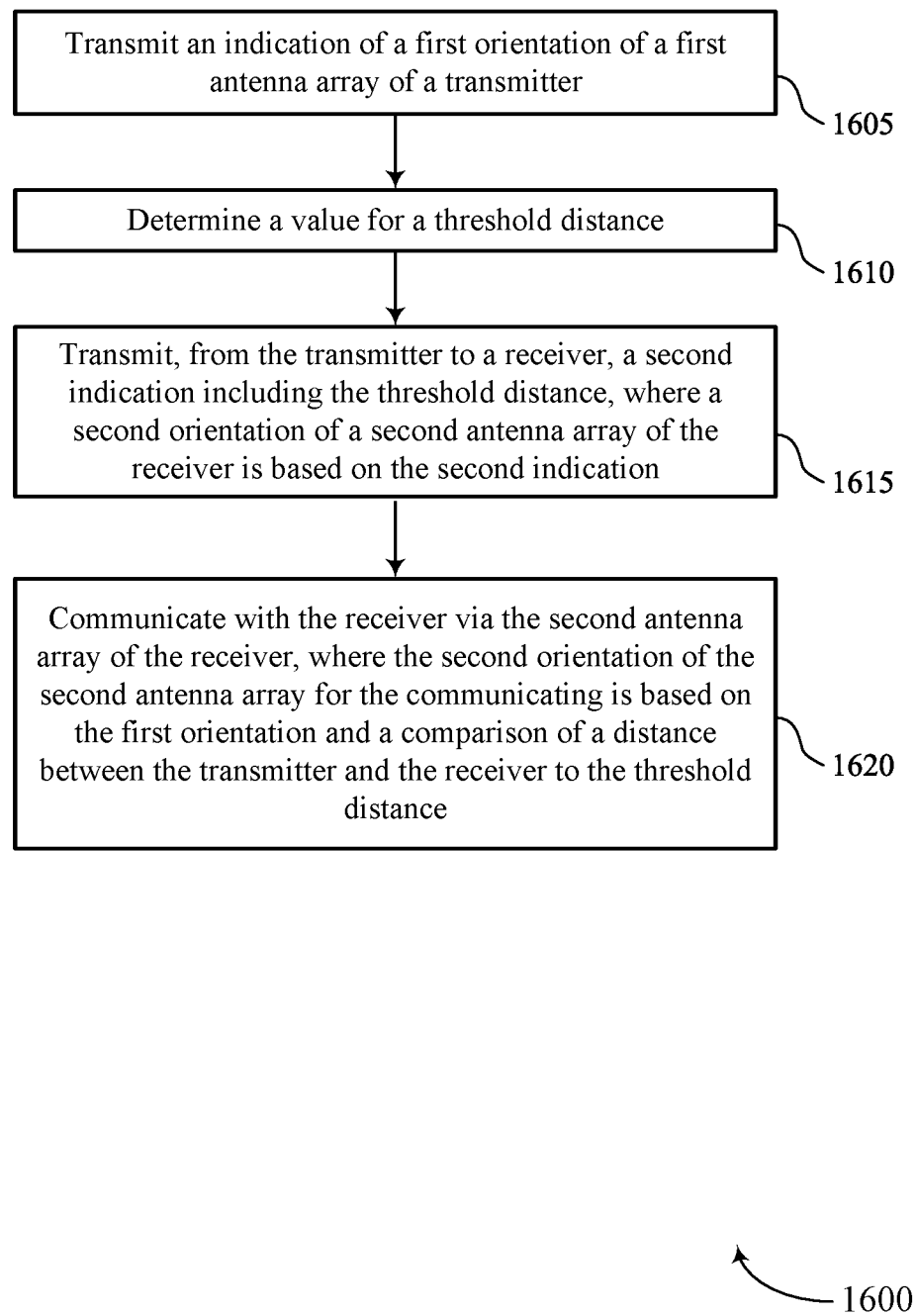

FIG. 16 shows a flowchart illustrating a method 1600 that supports receiver alignment to enhance signal quality in near-field communications in accordance with aspects of the present disclosure. The operations of the method 1600 may be implemented by a transmitter or its components as described herein. For example, the operations of the method 1600 may be performed by a transmitter as described with reference to FIGS. 1 through 4 and 9 through 12. In some examples, a transmitter may execute a set of instructions to control the functional elements of the transmitter to perform the described functions. Additionally, or alternatively, the transmitter may perform aspects of the described functions using special-purpose hardware.

At 1605, the method may include transmitting an indication of a first orientation of a first antenna array of a transmitter. The operations of block 1605 may be performed in accordance with examples as disclosed herein. In some examples, aspects of the operations of 1605 may be performed by a transmitting component 1125 as described with reference to FIG. 11.

At 1610, the method may include determining a value for a threshold distance. The operations of block 1610 may be performed in accordance with examples as disclosed herein. In some examples, aspects of the operations of 1610 may be performed by a threshold determination component 1135 as described with reference to FIG. 11.

At 1615, the method may include transmitting, from the transmitter to a receiver, a second indication including the threshold distance, where a second orientation of a second antenna array of the receiver is based on the second indication. The operations of block 1615 may be performed in accordance with examples as disclosed herein. In some examples, aspects of the operations of 1615 may be performed by a transmitting component 1125 as described with reference to FIG. 11.

At 1620, the method may include communicating with the receiver via the second antenna array of the receiver, where the second orientation of the second antenna array for the communicating is based on the first orientation and a comparison of a distance between the transmitter and the receiver to the threshold distance. The operations of block 1620 may be performed in accordance with examples as disclosed herein. In some examples, aspects of the operations of 1620 may be performed by a communication component 1130 as described with reference to FIG. 11.

The following provides an overview of aspects of the present disclosure:

Aspect 1: A method for wireless communications by a receiver, comprising: receiving an indication of a first orientation of a first antenna array of a transmitter; and communicating with the transmitter via a second antenna array of the receiver, wherein a second orientation of the second antenna array for the communicating is selected based at least in part on the first orientation and a comparison of a distance between the receiver and the transmitter to a threshold distance.

Aspect 2: The method of aspect 1, further comprising: receiving a second indication from the transmitter comprising the threshold distance, wherein the second orientation is based at least in part on the second indication.

Aspect 3: The method of aspect 2, wherein the threshold distance is based at least in part on a size of the first antenna array.

Aspect 4: The method of any of aspects 1 through 3, wherein the threshold distance comprises a first threshold distance for a first direction, a second threshold distance for a second direction, a third distance for a third direction, or a combination thereof.

Aspect 5: The method of any of aspects 1 through 4, wherein the threshold distance comprises a first threshold value associated with a radial threshold distance.

Aspect 6: The method of any of aspects 1 through 5, wherein the second orientation is parallel to the first orientation based at least in part on the distance between the receiver and the transmitter failing to satisfy the threshold distance.

Aspect 7: The method of any of aspects 1 through 5, wherein the second orientation is normal to a radial direction between the transmitter and the receiver based at least in part on the distance between the receiver and the transmitter satisfying the threshold distance.

Aspect 8: The method of any of aspects 1 through 7, wherein the second antenna array comprises a plurality of subarrays, and wherein selecting the second orientation comprises: selecting one or more of the plurality of subarrays to use for the communicating based at least in part on the second orientation.

Aspect 9: The method of any of aspects 1 through 8, further comprising: transmitting an indication of a performance loss to the transmitter based at least in part on failing to orient the second antenna array according to the second orientation.

Aspect 10: The method of aspect 9, further comprising: generating an alert message for a user, the alert message coming from an application layer program and comprising an instruction to orient the second antenna array according to the second orientation.

Aspect 11: The method of any of aspects 1 through 10, wherein the indication of the first orientation is received via a system information message, a control information message, or both.

Aspect 12: The method of any of aspects 1 through 11, wherein the indication of the first orientation comprises a boresight direction of the first antenna array.

Aspect 13: The method of any of aspects 1 through 12, further comprising: determining the distance between the receiver and the transmitter by calculating a first location of the receiver and a second location of the transmitter based at least in part on a positioning protocol, the positioning protocol associated with a local coordinate system, a global coordinate system, or both.

Aspect 14: A method for wireless communications by a transmitter, comprising: transmitting an indication of a first orientation of a first antenna array of the transmitter; and communicating with a receiver via a second antenna array of the receiver, wherein a second orientation of the second antenna array for the communicating is based at least in part on the first orientation and a comparison of a distance between the transmitter and the receiver to a threshold distance.

Aspect 15: The method of aspect 14, further comprising: determining a value for the threshold distance; and transmitting, from the transmitter to the receiver, a second indication comprising the threshold distance, wherein the second orientation is based at least in part on the second indication.

Aspect 16: The method of aspect 15, wherein determining the value for the threshold distance is based at least in part on a size of the first antenna array.

Aspect 17: The method of any of aspects 14 through 16, wherein the threshold distance comprises a first threshold distance for a first direction, a second threshold distance for a second direction, a third distance for a third direction, or a combination thereof.

Aspect 18: The method of any of aspects 14 through 17, wherein the threshold distance comprises a first threshold value associated with a radial threshold distance.

Aspect 19: The method of any of aspects 14 through 18, wherein the second orientation is parallel to the first orientation based at least in part on the distance between the receiver and the transmitter failing to satisfy the threshold distance.

Aspect 20: The method of any of aspects 14 through 18, wherein the second orientation is normal to a radial direction between the transmitter and the receiver based at least in part on the distance between the receiver and the transmitter satisfying the threshold distance.

Aspect 21: The method of any of aspects 14 through 20, further comprising: receiving an indication of a performance loss from the receiver based at least in part on the receiver failing to orient the second antenna array according to the second orientation.

Aspect 22: The method of aspect 21, further comprising: adjusting the first antenna array to operate according to a third orientation different than the first orientation based at least in part on receiving the indication of the performance loss; and communicating with the receiver via the first antenna array and the second antenna array of the receiver.

Aspect 23: The method of any of aspects 21 through 22, further comprising: increasing a transmit power for the first antenna array based at least in part on receiving the indication of the performance loss; and communicating with the receiver in accordance with increasing the transmit power.

Aspect 24: The method of any of aspects 14 through 23, wherein the indication of the first orientation is transmitted via a system information message, a control information message, or both.

Aspect 25: The method of any of aspects 14 through 24, wherein the indication of the first orientation comprises a boresight direction of the first antenna array.

Aspect 26: The method of any of aspects 14 through 25, further comprising: determining the distance between the receiver by calculating a first location of the transmitter and a second location of the receiver based at least in part on a positioning protocol, the positioning protocol associated with a local coordinate system, a global coordinate system, or both.

Aspect 27: A receiver for wireless communications, comprising one or more memories storing processor-executable code, and one or more processors coupled with the one or more memories and individually or collectively operable to execute the code to cause the receiver to perform a method of any of aspects 1 through 13.

Aspect 28: A receiver for wireless communications, comprising at least one means for performing a method of any of aspects 1 through 13.

Aspect 29: A non-transitory computer-readable medium storing code for wireless communications, the code comprising instructions executable by a processor to perform a method of any of aspects 1 through 13.

Aspect 30: A transmitter for wireless communications, comprising one or more memories storing processor-executable code, and one or more processors coupled with the one or more memories and individually or collectively operable to execute the code to cause the transmitter to perform a method of any of aspects 14 through 26.

Aspect 31: A transmitter for wireless communications, comprising at least one means for performing a method of any of aspects 14 through 26.

Aspect 32: A non-transitory computer-readable medium storing code for wireless communications, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A receiver for wireless communications, comprising:
one or more memories storing processor-executable code; and
one or more processors coupled with the one or more memories and individually or collectively operable to execute the code to cause the receiver to:
receive an indication of a first orientation of a first antenna array of a transmitter; and
communicate with the transmitter via a second antenna array of the receiver, wherein a second orientation of the second antenna array for the communicating is selected based at least in part on the first orientation and a comparison of a distance between the receiver and the transmitter to a threshold distance.

2. The receiver of claim 1, wherein the one or more processors are individually or collectively further operable to execute the code to cause the receiver to:
receive a second indication from the transmitter comprising the threshold distance, wherein the second orientation is based at least in part on the second indication.

3. The receiver of claim 2, wherein the threshold distance is based at least in part on a size of the first antenna array.

4. The receiver of claim 1, wherein the threshold distance comprises a first threshold distance for a first direction, a second threshold distance for a second direction, a third distance for a third direction, or a combination thereof.

5. The receiver of claim 1, wherein the threshold distance comprises a first threshold value associated with a radial threshold distance.

6. The receiver of claim 1, wherein the second orientation is parallel to the first orientation based at least in part on the distance between the receiver and the transmitter failing to satisfy the threshold distance.

7. The receiver of claim 1, wherein the second orientation is normal to a radial direction between the transmitter and the receiver based at least in part on the distance between the receiver and the transmitter satisfying the threshold distance.

8. The receiver of claim 1, wherein the second antenna array comprises a plurality of subarrays, and wherein, to select the second orientation, the one or more processors are individually or collectively operable to execute the code to cause the receiver to:
select one or more of the plurality of subarrays to use for the communicating based at least in part on the second orientation.

9. The receiver of claim 1, wherein the one or more processors are individually or collectively further operable to execute the code to cause the receiver to:
transmit an indication of a performance loss to the transmitter based at least in part on failing to orient the second antenna array according to the second orientation.

10. The receiver of claim 9, wherein the one or more processors are individually or collectively further operable to execute the code to cause the receiver to:
generate an alert message for a user, the alert message coming from an application layer program and comprising an instruction to orient the second antenna array according to the second orientation.

11. The receiver of claim 1, wherein the indication of the first orientation is received via a system information message, a control information message, or both.

12. The receiver of claim 1, wherein the indication of the first orientation comprises a boresight direction of the first antenna array.

13. The receiver of claim 1, wherein the one or more processors are individually or collectively further operable to execute the code to cause the receiver to:
determine the distance between the receiver and the transmitter by calculating a first location of the receiver and a second location of the transmitter based at least in part on a positioning protocol, the positioning protocol associated with a local coordinate system, a global coordinate system, or both.

14. A transmitter for wireless communications, comprising:
one or more memories storing processor-executable code; and
one or more processors coupled with the one or more memories and individually or collectively operable to execute the code to cause the transmitter to:
transmit an indication of a first orientation of a first antenna array of the transmitter; and
communicate with a receiver via a second antenna array of the receiver, wherein a second orientation of the second antenna array for the communicating is based at least in part on the first orientation and a comparison of a distance between the transmitter and the receiver to a threshold distance.

15. The transmitter of claim 14, wherein the one or more processors are individually or collectively further operable to execute the code to cause the transmitter to:
determine a value for the threshold distance; and
transmit, from the transmitter to the receiver, a second indication comprising the threshold distance, wherein the second orientation is based at least in part on the second indication.

16. The transmitter of claim 15, wherein determining the value for the threshold distance is based at least in part on a size of the first antenna array.

17. The transmitter of claim 14, wherein the threshold distance comprises a first threshold distance for a first direction, a second threshold distance for a second direction, a third distance for a third direction, or a combination thereof.

18. The transmitter of claim 14, wherein the threshold distance comprises a first threshold value associated with a radial threshold distance.

19. The transmitter of claim 14, wherein the second orientation is parallel to the first orientation based at least in part on the distance between the receiver and the transmitter failing to satisfy the threshold distance.

20. The transmitter of claim 14, wherein the second orientation is normal to a radial direction between the transmitter and the receiver based at least in part on the distance between the receiver and the transmitter satisfying the threshold distance.

21. The transmitter of claim 14, wherein the one or more processors are individually or collectively further operable to execute the code to cause the transmitter to:
receive an indication of a performance loss from the receiver based at least in part on the receiver failing to orient the second antenna array according to the second orientation.

22. The transmitter of claim 21, wherein the one or more processors are individually or collectively further operable to execute the code to cause the transmitter to:
adjust the first antenna array to operate according to a third orientation different than the first orientation based at least in part on receiving the indication of the performance loss; and
communicate with the receiver via the first antenna array and the second antenna array of the receiver.

23. The transmitter of claim 21, wherein the one or more processors are individually or collectively further operable to execute the code to cause the transmitter to:
increase a transmit power for the first antenna array based at least in part on receiving the indication of the performance loss; and
communicate with the receiver in accordance with increasing the transmit power.

24. The transmitter of claim 14, wherein the indication of the first orientation is transmitted via a system information message, a control information message, or both.

25. The transmitter of claim 14, wherein the indication of the first orientation comprises a boresight direction of the first antenna array.

26. The transmitter of claim 14, wherein the one or more processors are individually or collectively further operable to execute the code to cause the transmitter to:
determine the distance between the receiver by calculating a first location of the transmitter and a second location of the receiver based at least in part on a positioning protocol, the positioning protocol associated with a local coordinate system, a global coordinate system, or both.

27. A method for wireless communications by a receiver, comprising:
receiving an indication of a first orientation of a first antenna array of a transmitter; and
communicating with the transmitter via a second antenna array of the receiver, wherein a second orientation of the second antenna array for the communicating is selected based at least in part on the first orientation and a comparison of a distance between the receiver and the transmitter to a threshold distance.

28. The method of claim 27, further comprising:
receiving a second indication from the transmitter comprising the threshold distance, wherein the second orientation is based at least in part on the second indication.

29. A method for wireless communications by a transmitter, comprising:
transmitting an indication of a first orientation of a first antenna array of the transmitter; and
communicating with a receiver via a second antenna array of the receiver, wherein a second orientation of the second antenna array for the communicating is based at least in part on the first orientation and a comparison of a distance between the transmitter and the receiver to a threshold distance.

30. The method of claim 29, further comprising:
determining a value for the threshold distance; and
transmitting, from the transmitter to the receiver, a second indication comprising the threshold distance, wherein the second orientation is based at least in part on the second indication.

* * * * *